(12) United States Patent
Von Novak, III et al.

(10) Patent No.: US 10,084,321 B2
(45) Date of Patent: Sep. 25, 2018

(54) CONTROLLING FIELD DISTRIBUTION OF A WIRELESS POWER TRANSMITTER

(71) Applicant: QUALCOMM Incorporated, San Diego, CA (US)

(72) Inventors: William Henry Von Novak, III, San Diego, CA (US); Francesco Carobolante, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 300 days.

(21) Appl. No.: 14/864,938

(22) Filed: Sep. 25, 2015

(65) Prior Publication Data

US 2017/0005481 A1 Jan. 5, 2017

Related U.S. Application Data

(60) Provisional application No. 62/187,967, filed on Jul. 2, 2015.

(51) Int. Cl.
| | |
|---|---|
| *H01F 27/42* | (2006.01) |
| *H01F 37/00* | (2006.01) |
| *H01F 38/00* | (2006.01) |
| *H02J 5/00* | (2016.01) |
| *H02J 7/02* | (2016.01) |

(Continued)

(52) U.S. Cl.
CPC .............. *H02J 5/005* (2013.01); *H02J 7/025* (2013.01); *H02J 50/12* (2016.02); *H02J 50/70* (2016.02)

(58) Field of Classification Search
CPC .. H04B 1/04; H04B 5/00; H01F 38/14; H01Q 5/335; H01Q 19/045; H01Q 9/045; H01Q 9/04; H01Q 3/00; H01Q 3/24; H01Q 21/006; H01Q 21/30; H01Q 1/27; H02J 7/00
USPC ......... 307/104, 108, 9.1; 455/129, 130, 132; 342/367, 365; 343/876, 879, 871
See application file for complete search history.

(56) References Cited

U.S. PATENT DOCUMENTS

| | | | |
|---|---|---|---|
| 6,034,638 | A | 3/2000 | Thiel et al. |
| 6,255,990 | B1 | 7/2001 | King |
| 6,906,495 | B2 | 6/2005 | Cheng et al. |

(Continued)

FOREIGN PATENT DOCUMENTS

| | | |
|---|---|---|
| CN | 2694585 Y | 4/2005 |
| CN | 101095262 A | 12/2007 |

(Continued)

OTHER PUBLICATIONS

International Search Report and Written Opinion—PCT/US2016/037733—ISA/EPO—dated Aug. 22, 2016.

*Primary Examiner* — Rexford Barnie
*Assistant Examiner* — Jagdeep Dhillon
(74) *Attorney, Agent, or Firm* — Smith Tempel Blaha, LLC

(57) ABSTRACT

Exemplary embodiments are directed to an apparatus for controlling magnetic field distribution including a wireless transmit antenna configured to generate a magnetic field for wirelessly transferring power to a charge-receiving device with the wireless transmit antenna, a parasitic antenna located near the wireless transmit antenna, and a switch configured to selectively enable the parasitic antenna to modify the magnetic field in response to an antenna parameter that indicates the presence of the charge-receiving device relative to the parasitic antenna.

22 Claims, 25 Drawing Sheets

(51) Int. Cl.
*H02J 50/12* (2016.01)
*H02J 50/70* (2016.01)

(56) References Cited

U.S. PATENT DOCUMENTS

| | | | |
|---|---|---|---|
| 7,265,731 B2 | 9/2007 | Vance et al. | |
| 7,948,208 B2 | 5/2011 | Partovi et al. | |
| 7,952,322 B2 | 5/2011 | Partovi et al. | |
| 8,278,784 B2 | 10/2012 | Cook et al. | |
| 8,855,554 B2* | 10/2014 | Cook | H02J 5/005 |
| | | | 455/41.1 |
| 8,934,857 B2 | 1/2015 | Low et al. | |
| 9,337,666 B2 | 5/2016 | Low et al. | |
| 9,368,975 B2 | 6/2016 | Wheeland et al. | |
| 2005/0093750 A1 | 5/2005 | Vance | |
| 2007/0069958 A1 | 3/2007 | Ozkar | |
| 2008/0303633 A1 | 12/2008 | Cheng et al. | |
| 2009/0046022 A1 | 2/2009 | Desclos et al. | |
| 2009/0096413 A1 | 4/2009 | Partovi et al. | |
| 2009/0134712 A1 | 5/2009 | Cook et al. | |
| 2009/0179502 A1 | 7/2009 | Cook et al. | |
| 2009/0212636 A1 | 8/2009 | Cook et al. | |
| 2009/0243397 A1 | 10/2009 | Cook et al. | |
| 2009/0278746 A1 | 11/2009 | Aurinsalo et al. | |
| 2009/0284082 A1 | 11/2009 | Mohammadian | |
| 2009/0284227 A1 | 11/2009 | Mohammadian et al. | |
| 2009/0284369 A1 | 11/2009 | Toncich et al. | |
| 2010/0038970 A1 | 2/2010 | Cook et al. | |
| 2010/0052431 A1 | 3/2010 | Mita | |
| 2011/0050164 A1 | 3/2011 | Partovi et al. | |
| 2011/0074349 A1 | 3/2011 | Ghovanloo | |
| 2011/0281535 A1* | 11/2011 | Low | H02J 7/025 |
| | | | 455/129 |
| 2011/0304216 A1 | 12/2011 | Baarman | |
| 2012/0080957 A1 | 4/2012 | Cooper et al. | |
| 2013/0119924 A1 | 5/2013 | Kasturi et al. | |
| 2013/0307346 A1* | 11/2013 | Arisawa | H01F 38/14 |
| | | | 307/104 |
| 2014/0125275 A1* | 5/2014 | Low | H04B 5/0093 |
| | | | 320/108 |
| 2014/0375501 A1* | 12/2014 | Nikitin | H01Q 1/245 |
| | | | 342/367 |
| 2015/0255859 A1* | 9/2015 | Harper | H01Q 19/005 |
| | | | 343/718 |
| 2016/0134017 A1* | 5/2016 | Lin | H01Q 5/335 |
| | | | 343/861 |
| 2016/0204520 A1* | 7/2016 | Dong | H01Q 21/30 |
| | | | 343/745 |
| 2016/0241075 A1 | 8/2016 | Von Novak, III | |
| 2016/0256187 A1* | 9/2016 | Shelton, IV | A61B 17/068 |
| 2016/0307187 A1* | 10/2016 | Guo | G06K 19/0705 |

FOREIGN PATENT DOCUMENTS

| | | |
|---|---|---|
| EP | 1202216 A1 | 5/2002 |
| JP | H0472832 A | 3/1992 |
| JP | H10189369 A | 7/1998 |
| JP | 2002142356 A | 5/2002 |
| JP | 2003069335 A | 3/2003 |
| JP | 2003086233 A | 3/2003 |
| JP | 2010063245 A | 3/2010 |
| JP | 2010098807 A | 4/2010 |
| WO | 2005104296 A1 | 11/2005 |
| WO | 2009023646 A2 | 2/2009 |
| WO | 2009111597 A2 | 9/2009 |
| WO | 2009155030 A2 | 12/2009 |
| WO | 2010014634 A2 | 2/2010 |
| WO | 2010047850 A1 | 4/2010 |

* cited by examiner

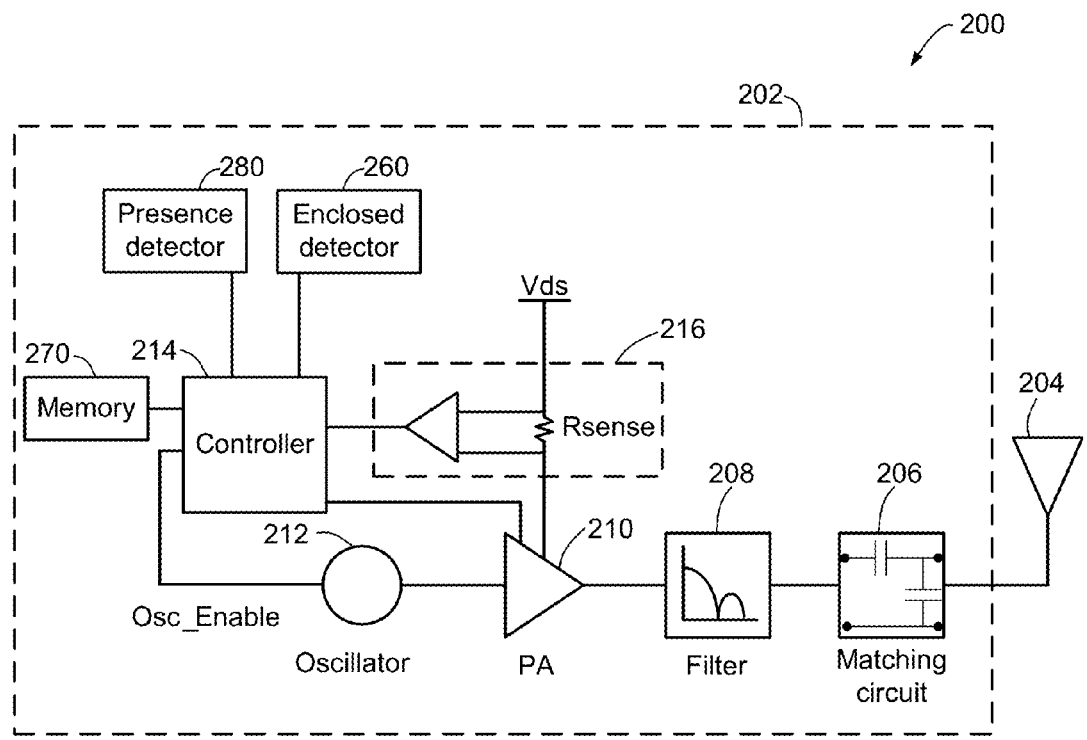
*FIG. 4A*
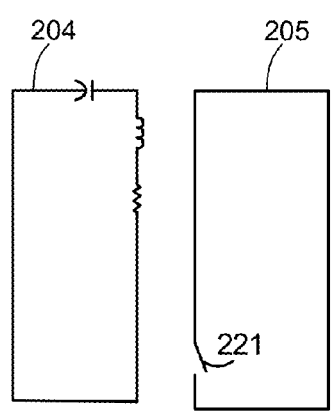 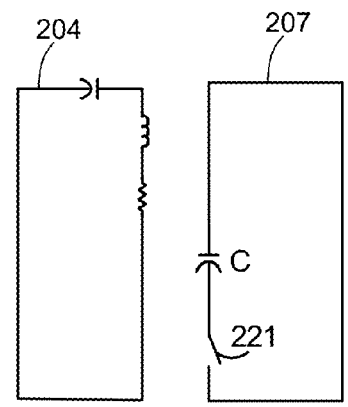
*FIG. 4B*  *FIG. 4C*

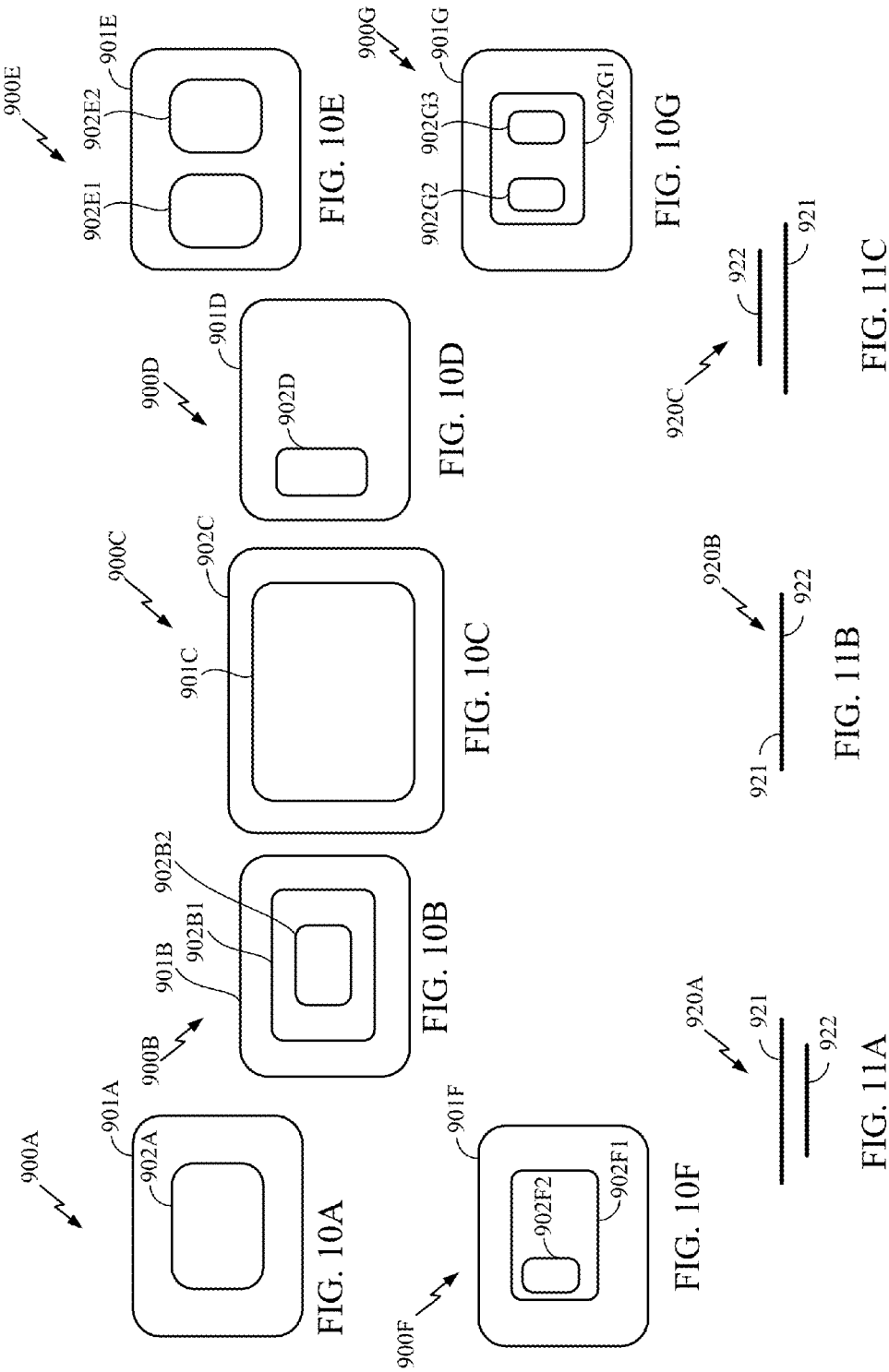

CONTROLLING FIELD DISTRIBUTION OF A WIRELESS POWER TRANSMITTER

RELATED APPLICATIONS

This application claims the benefit of U.S. Provisional Patent Application No. 62/187,967, entitled "Controlling Field Distribution Of A Wireless Power Transmitter," filed Jul. 2, 2015, the contents of which are hereby incorporated by reference in their entirety.

FIELD

The present invention relates generally to wireless power, and more specifically, to systems, device, and methods related to controlling distribution of a field generated by a wireless power transmitter.

BACKGROUND

Approaches are being developed that use over the air power transmission between a transmitter and the device to be charged. These generally fall into two categories. One is based on the coupling of plane wave radiation (also called far-field radiation) between a transmit antenna and receive antenna on the device to be charged which collects the radiated power and rectifies it for charging the battery. Antennas are generally resonant in order to improve the coupling efficiency. This approach suffers from the fact that the power coupling falls off quickly with distance between the antennas. So charging over reasonable distances (e.g., >1-2 m) becomes difficult. Additionally, since the system radiates plane waves, unintentional radiation can interfere with other systems if not properly controlled through filtering.

Other approaches are based on inductive coupling between a transmit antenna embedded, for example, in a "charging" mat or surface and a receive antenna plus rectifying circuit embedded in the host device to be charged. This approach has the disadvantage that the spacing between transmit and receive antennas must be very close (e.g. mms). Though this approach does have the capability to simultaneously charge multiple devices in the same area, this area is typically small, hence the user must locate the devices to a specific area.

As will be appreciated by a person having ordinary skill in the art, a near field communication (NFC) device may receive excessive power from a wireless power transmitter, which may result in undesirable heating of the NFC device. In addition, a rogue receiver might attempt to pick up power from the wireless power transmitter, thus affecting power delivery to a valid wireless power receiver and system efficiency.

Further, additional receivers or metal objects positioned within an associated charging region may detune a transmitter by reducing the self-inductance thereof. Variation in impedance looking into the transmitting coil of the transmitter may affect the performance of an associated driving amplifier. If the transmitting coil is significantly larger than the receiving coil, the coupling efficiency between the coils may suffer, which may impact charge time and cause potential thermal issues. Therefore, a higher efficiency coupling structure is desirable. It is also desirable to know the locations of one or more receivers within an associated charging region so that power may be diverted to the respective receivers.

A need exists for methods, systems, and devices for controlling field distribution of a wireless power transmitter. More specifically, a need exists for methods, systems, and devices for utilizing one or more parasitic antennas to control the field distribution of a wireless power transmitter.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides an apparatus for controlling magnetic field distribution including a wireless transmit antenna configured to generate a magnetic field for wirelessly transferring power to a charge-receiving device with the wireless transmit antenna, a parasitic antenna located in the region of the magnetic field generated by the wireless transmit antenna, and a switch configured to selectively enable the parasitic antenna to modify the magnetic field in response to an antenna parameter that indicates the presence of the charge-receiving device relative to the parasitic antenna.

Another aspect of the disclosure provides a method for controlling magnetic field distribution including generating a magnetic field for wirelessly transferring power to a charge-receiving device using a wireless transmit antenna, and selectively enabling a switch to modify the magnetic field using a parasitic antenna located in the region of the magnetic field generated by the wireless transmit antenna in response to an antenna parameter that indicates the presence of the charge-receiving device relative to the parasitic antenna.

Another aspect of the disclosure provides a device for controlling magnetic field distribution including means for generating a first magnetic field for wirelessly transferring power to a charge-receiving device, means for generating a second magnetic field that alters the first magnetic field, and means for selectively enabling the means for generating the second magnetic field in response to an antenna parameter that indicates the presence of the charge-receiving device relative to the means for generating the second magnetic.

Another aspect of the disclosure provides an apparatus for controlling magnetic field distribution including a wireless transmit antenna configured to generate a magnetic field for wirelessly transferring power to a charge-receiving device with the wireless transmit antenna, a parasitic antenna located in the region of the magnetic field generated by the wireless transmit antenna, and a switch configured to selectively enable the parasitic antenna to modify the magnetic field in response to an antenna parameter that indicates the presence of the charge-receiving device relative to the parasitic antenna, the switch powered by the magnetic field.

Another aspect of the disclosure provides a method for controlling magnetic field distribution including generating a magnetic field for wirelessly transferring power to a charge-receiving device with a wireless transmit antenna, and selectively enabling a switch to modify the magnetic field using a parasitic antenna located in the region of the magnetic field generated by the wireless transmit antenna in response to an antenna parameter that indicates the presence of the charge-receiving device relative to the parasitic antenna, the switch powered by the magnetic field.

BRIEF DESCRIPTION OF THE DRAWINGS

FIG. 4A is a simplified block diagram of a transmitter, in accordance with an exemplary embodiment.

FIG. 4B illustrates a parasitic antenna including a switch positioned proximate a transmit antenna.

FIG. 4C illustrates a parasitic antenna including a switch and a capacitor positioned proximate a transmit antenna.

FIGS. 10A-10G illustrate various example wireless power transmitter configurations wherein each configuration includes a transmit antenna and at least one parasitic antenna, in accordance with an exemplary embodiment.

FIGS. 11A-11C illustrate cross-sectional views of various example wireless power transmitter configurations wherein each configuration includes a transmit antenna and a parasitic antenna, in accordance with an exemplary embodiment.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving antenna" to achieve power transfer.

Figure 1:
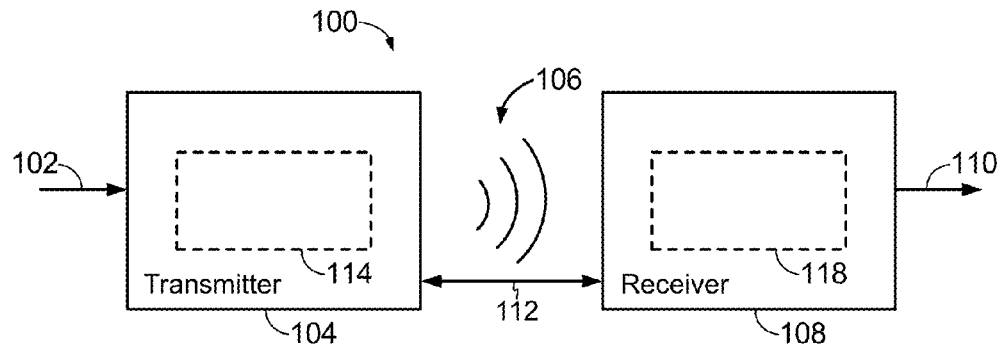
FIG. 1 shows a simplified block diagram of a wireless power transfer system.

FIG. 1 illustrates a wireless transmission or charging system 100, in accordance with various exemplary embodiments. Input power 102 is provided to a transmitter 104 for generating a field 106 (e.g., magnetic or species of electromagnetic) for providing energy transfer. A receiver 108 may couple to the field 106 and generate output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship. When the resonant frequency of receiver 108 and the resonant frequency of transmitter 104 are substantially the same or very close, transmission losses between the transmitter 104 and the receiver 108 are reduced. As such, wireless power transfer may be provided over larger distance in contrast to purely inductive solutions that may require large coils to be very close (e.g., millimeters). Resonant inductive coupling techniques may thus allow for improved efficiency and power transfer over various distances and with a variety of inductive coil configurations.

The receiver 108 may receive power when the receiver 108 is located in an energy field 106 produced by the transmitter 104. The field 106 corresponds to a region where energy output by the transmitter 104 may be captured by a receiver 108. In some cases, the field 106 may correspond to the "near-field" of the transmitter 104 as will be further described below. The transmitter 104 may include a transmit antenna (that may also be referred to herein as a coil) 114 for outputting an energy transmission. The receiver 108 further includes a receive antenna 118 (that may also be referred to herein as a coil) for receiving or capturing energy from the energy transmission. The near-field may correspond to a region in which there are strong reactive fields resulting from the currents and charges in the transmit antenna 114 that minimally radiate power away from the transmit antenna 114. In some cases the near-field may correspond to a region that is within about one wavelength (or a fraction thereof) of the transmit antenna 114.

In accordance with the above therefore, in accordance with more particular embodiments, the transmitter 104 may be configured to output a time varying magnetic field 106 with a frequency corresponding to the resonant frequency of the transmit antenna 114. When the receiver 108 is within the field 106, the time varying magnetic field may induce a voltage in the receive antenna 118 that causes an electrical current to flow through the receive antenna 118. As described above, if the receive antenna 118 is configured to be resonant at the frequency of the transmit antenna 114, energy may be more efficiently transferred. The AC signal induced in the receive antenna 118 may be rectified as described above to produce a DC signal that may be provided to charge or to power a load.

Figure 2:
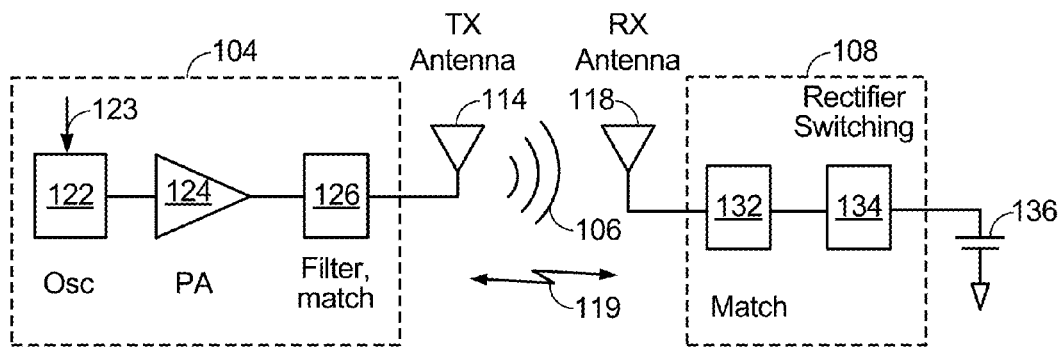
FIG. 2 shows a simplified schematic diagram of a wireless power transfer system.

FIG. 2 is a simplified schematic diagram of a wireless power transfer system. The transmitter 104 includes an oscillator 122, a power amplifier 124 and a filter and matching circuit 126. The oscillator 122 may be configured to generate a signal at a desired frequency, such as, for example only, 468.75 KHz, 6.78 MHz or 13.56, that may be adjusted in response to a frequency control signal 123. The oscillator signal may be provided to a power amplifier 124 configured to drive the transmit antenna 114 at, for example, a resonant frequency of the transmit antenna 114. The power amplifier 124 may be a switching amplifier configured to receive a square wave from the oscillator 122 and output a sine wave. For example, the power amplifier 124 may be a class E amplifier. A filter and matching circuit 126 may be also included to filter out harmonics or other unwanted frequencies and match the impedance of the transmitter 104 to the impedance of the transmit antenna 114. As a result of driving the transmit antenna 114, the transmitter 104 may wirelessly output power at a level sufficient for charging or powering an electronic device. As one example, the power provided may be for example on the order of 300 milliWatts to 5 Watts or 5 Watts to 40 Watts to power or charge different devices with different power requirements. Higher or lower power levels may also be provided.

The receiver 108 may include a matching circuit 132 and a rectifier and switching circuit 134 to generate a DC power output from an AC power input to charge a battery 136 as shown in FIG. 2 or power a device (not shown) coupled to the receiver 108. The matching circuit 132 may be included to match the impedance of the receiver 108 to the impedance of the receive antenna 118. The receiver 108 and transmitter 104 may additionally communicate on a separate communication channel 119 (e.g., Bluetooth, zigbee, cellular, etc.). The receiver 108 and transmitter 104 may alternatively communicate via in-band signaling using characteristics of the wireless field 106.

Figure 3:
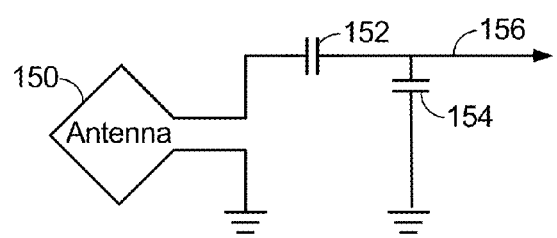
FIG. 3 illustrates a schematic diagram of a loop antenna for use in exemplary embodiments.

FIG. 3 is a schematic diagram of a portion of transmit circuitry 104 or receive circuitry 108 of FIG. 2 including a transmit or receive antenna 150, in accordance with exemplary embodiments. As illustrated in FIG. 3, antennas used in exemplary embodiments may be configured as a "loop" antenna 150. The antenna 150 may also be referred to herein or be configured as a "magnetic" antenna or an induction coil. The term "antenna" generally refers to a component that may wirelessly output or receive energy for coupling to another "antenna." The antenna may also be referred to as a coil of a type that is configured to wirelessly output or receive power. As used herein, an antenna 150 is an example of a "power transfer component" of a type that is configured to wirelessly output and/or receive power. The antenna 150 may be configured to include an air core or a physical core such as a ferrite core (not shown). Air core loop antennas may be configured to include an air core or a physical core such as a ferrite core.

As stated, efficient transfer of energy between the transmitter 104 and receiver 108 occurs during matched or nearly matched resonance (i.e., the frequencies are matched) between the transmitter 104 and the receiver 108. However, even when resonance between the transmitter 104 and receiver 108 are not matched, energy may be transferred, although the efficiency may be affected. Transfer of energy occurs by coupling energy from the field 106 of the transmit antenna 114 to the receive antenna 118 residing in the neighborhood where this field 106 is established rather than propagating the energy from the transmitting antenna into free space.

The resonant frequency of the loop or magnetic antennas is based on the inductance and capacitance. Inductance may be simply the inductance created by the antenna 150, whereas, capacitance may be added to create a resonant structure at a desired resonant frequency. As a non-limiting example, capacitor 152 and capacitor 154 may be added to the antenna 150 to create a resonant circuit that selects a signal 156 at a resonant frequency. Accordingly, for larger diameter antennas, the size of capacitance needed to sustain resonance may decrease as the diameter or inductance of the loop increases. Furthermore, as the diameter of the antenna increases, the efficient energy transfer area of the near-field may increase. Other resonant circuits formed using other components may be possible. As another non-limiting example, a capacitor may be placed in parallel between the two terminals of the antenna 150. For transmit antennas, a signal 156 with a frequency that substantially corresponds to the resonant frequency of the antenna 150 may be an input to the antenna 150. For receive antennas, the signal 156 may be output to power or charge a load.

FIG. 4A is a simplified block diagram of a transmitter 200, in accordance with an exemplary embodiment. The transmitter 200 includes transmit circuitry 202 and a transmit antenna 204. Generally, transmit circuitry 202 provides RF power to the transmit antenna 204 by providing an oscillating signal resulting in generation of near-field energy about the transmit antenna 204. It is noted that transmitter 200 may operate at any suitable frequency. By way of example, transmitter 200 may operate at the 13.56 MHz ISM band or the 6.78 MHz ISM band.

Exemplary transmit circuitry 202 includes a fixed impedance matching circuit 206 for matching the impedance of the transmit circuitry 202 (e.g., 50 ohms) to the impedance of the transmit antenna 204 (i.e., the load and the source are matched to enhance efficiency) and a low pass filter (LPF) 208 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that can be varied based on measurable transmit metrics, such as output power to the antenna or DC current drawn by the power amplifier. Transmit circuitry 202 further includes a power amplifier 210 configured to drive a signal as determined by an oscillator 212. The transmit circuitry may be comprised of discrete devices or circuits, or alternately, may be comprised of an integrated assembly.

Transmit circuitry 202 further includes a controller 214 for enabling the oscillator 212 during transmit phases (or duty cycles) for specific receivers, for adjusting the frequency or phase of the oscillator, and for adjusting the output power level for implementing a communication protocol for interacting with neighboring devices through their attached receivers. As is well known in the art, adjustment of oscillator phase and related circuitry in the transmission path allows for reduction of out of band emissions, especially when transitioning from one frequency to another. The controller 214 may also be referred to as a processor. A memory 270 may be coupled to the controller 214.

The transmit circuitry 202 may further include a load sensing circuit 216 for detecting the presence or absence of active receivers in the vicinity of the near-field generated by transmit antenna 204. By way of example, a load sensing circuit 216 monitors the current flowing to the power amplifier 210, which is affected by the presence or absence of active receivers in the vicinity of the near-field generated by transmit antenna 204. Detection of changes to the loading on the power amplifier 210 are monitored by controller 214 for use in determining whether to enable the oscillator 212 for transmitting energy and to communicate with an active receiver.

Transmit antenna 204 may be implemented with a Litz wire or as an antenna strip with the thickness, width and metal type selected to keep resistive losses low. The transmit antenna 204 can be configured for association with a larger structure such as a table, mat, lamp or other less portable configuration. Accordingly, the transmit antenna 204 may not need "turns" in order to be of a practical dimension. An exemplary implementation of a transmit antenna 204 may be "electrically small" (i.e., fraction of the wavelength) and tuned to resonate at lower usable frequencies by using capacitors to define the resonant frequency. In an exemplary application where the transmit antenna 204 may be larger in diameter, or length of side if a square loop, (e.g., 0.50 meters) relative to the receive antenna, the transmit antenna 204 will not necessarily need a large number of turns to obtain a reasonable capacitance.

The transmitter 200 may gather and track information about the whereabouts and status of receiver devices that may be associated with the transmitter 200. Thus, the transmitter circuitry 202 may include a presence detector 280, an enclosed detector 260, or a combination thereof, connected to the controller 214 (also referred to as a processor herein). The controller 214 may adjust an amount of power delivered by the amplifier 210 in response to presence signals from the presence detector 280 and the enclosed detector 260. The transmitter may receive power through a number of power sources, such as, for example, an AC-DC converter (not shown) to convert AC power present in a building, a DC-DC converter (not shown) to convert a DC power source to a voltage suitable for the transmitter 200, or directly from a DC power source (not shown).

As a non-limiting example, the presence detector 280 may be a motion detector utilized to sense the initial presence of a device to be charged that is inserted into the coverage area of the transmitter. After detection, the transmitter may be turned on and the power received by the device may be used to toggle a switch on the receiver device in a pre-determined manner, which in turn results in changes to the driving point impedance of the transmitter.

As another non-limiting example, the presence detector 280 may be a detector capable of detecting a human, for example, by infrared detection, motion detection, or other suitable means. In some exemplary embodiments, there may be regulations limiting the amount of power that a transmit antenna may transmit at a specific frequency. In some cases, these regulations are meant to protect humans from electromagnetic radiation. However, there may be environments where transmit antennas are placed in areas not occupied by humans, or occupied infrequently by humans, such as, for example, garages, factory floors, shops, and the like. If these environments are free from humans, it may be permissible to increase the power output of the transmit antennas above the normal power restrictions regulations. In other words, the controller 214 may adjust the power output of the transmit antenna 204 to a regulatory level or lower in response to human presence and adjust the power output of the transmit antenna 204 to a level above the regulatory level when a human is outside a regulatory distance from the electromagnetic field of the transmit antenna 204.

As a non-limiting example, the enclosed detector 260 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 200 does not remain on indefinitely may be used. In this case, the transmitter 200 may be programmed to shut off after a user-determined amount of time. This feature prevents the transmitter 200, notably the power amplifier 210, from running long after the wireless devices in its perimeter are fully charged. This event may be due to the failure of the circuit to detect the signal sent from either the repeater or the receive coil that a device is fully charged. To prevent the transmitter 200 from automatically shutting down if another device is placed in its perimeter, the transmitter 200 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

FIG. 4B illustrates transmit antenna 204 proximate to a parasitic antenna 205 including a switch 221, which may be selectively controlled. As described more fully below, a shorted parasitic antenna (i.e., parasitic antenna 205 with switch 221 closed) may induce a current that modifies e.g., opposes) a field generated by transmit antenna 204. FIG. 4C illustrates transmit antenna 204 proximate a parasitic antenna 207 including switch 221, which may be selectively controlled, and a capacitor C. As described more fully below, a shorted parasitic antenna having a capacitor (i.e., parasitic antenna 207 with switch 221 closed) may induce a current that modifies a field generated by transmit antenna 204. For example, closing the switch 221 may induce a current in the parasitic antenna 207 thus altering the field strength generated by the transmit antenna 204 or altering the reflected impedance of the transmit antenna 204.

Figure 4D:
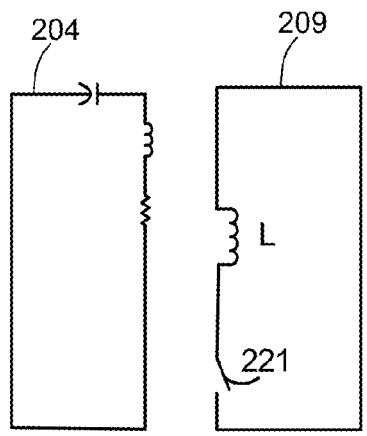
FIG. 4D illustrates a parasitic antenna including a switch and an inductor positioned proximate a transmit antenna.

FIG. 4D illustrates transmit antenna 204 proximate to a parasitic antenna 209 including switch 221, which may be selectively controlled, and an inductor L. As described more fully below, a shorted parasitic antenna having an inductor (i.e., parasitic antenna 209 with switch 221 closed) may induce a current that modifies a field generated by transmit antenna 204. For example, closing the switch 221 may induce a current in the parasitic antenna 209 thus altering the field strength generated by the transmit antenna 204 or altering the reflected impedance of the transmit antenna 204.

Figure 4E:
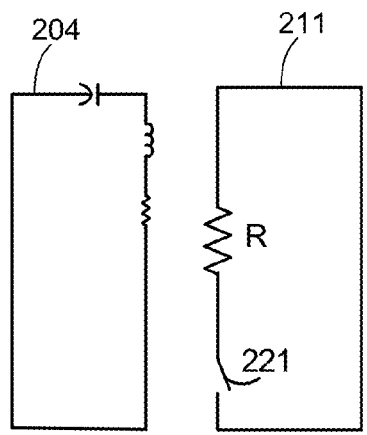
FIG. 4E illustrates a parasitic antenna including a switch and a resistor positioned proximate a transmit antenna.

FIG. 4E illustrates transmit antenna 204 proximate a parasitic antenna 211 including switch 221, which may be selectively controlled, and a resistor R. As described more fully below, a shorted parasitic antenna having a resistor (i.e., parasitic antenna 211 with switch 221 closed) may induce a current that modifies a field generated by transmit antenna 204. For example, closing the switch 221 may induce a current in the parasitic antenna 211 thus reducing the field strength generated by the transmit antenna 204 or altering the reflected impedance of the transmit antenna 204.

In an exemplary embodiment, the switch 221 may be selectively controlled by the controller 214 to place a parasitic antenna into any combination of one or more of the states discussed herein.

Figure 4F:
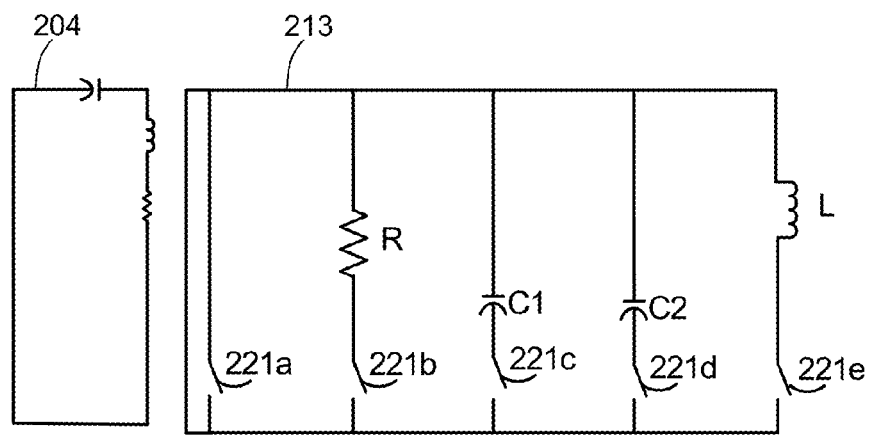
FIG. 4F illustrates a parasitic antenna including a switch and a resistor, an inductor and two capacitors positioned proximate a transmit antenna.

FIG. 4F illustrates transmit antenna 204 proximate a parasitic antenna 213 including a switch 221a, which may be selectively controlled to short circuit the parasitic antenna 213, a switch 221b configured to switch a resistor, R, a switch 221c configured to switch a first capacitor C1, a switch 221d configured to switch a second capacitor C2, and a switch 221e configured to switch an inductor, L.

As described more fully below, a shorted parasitic antenna, or a parasitic antenna having a resistor and/or one or more capacitors C1 and C2 and/or one or more inductors L (i.e., parasitic antenna 213 with one or more of switches 221a, 221b, 221c, 221d and 221e closed) may induce a current that modifies a field generated by transmit antenna 204. In an exemplary embodiment, the switches 221a, 221b, 221c, 221d and 221e may be selectively controlled by the controller 214 to place a parasitic antenna into any combination of one or more of the shorted, resistive, capacitive or inductive states discussed herein.

In the embodiment shown in FIG. 4F, the five switches 221a, 221b, 221c, 221d and 221e allow the parasitic antenna 213 to provide various field modification effects. For example, in a first exemplary embodiment, the parasitic antenna 213 may be shorted (e.g., placed into a blocking state) by closing the switch 221a, while the other switches remain open. In another exemplary embodiment, the parasitic antenna 213 may be placed into a resistive state (e.g., providing field reduction), by closing the switch 221b, while the other switches remain open. In another exemplary embodiment, the parasitic antenna may be configured to provide two levels of capacitance tuning for off-tuned (off resonant, or non-resonant) operation to adjust impedance by closing one or both of the switch 221c and the switch 221d, while the other switches remain open. In another exemplary embodiment, the parasitic antenna may be configured to alter the inductance presented to the transmitter power amplifier 210 by closing the switch 221e, while the other switches remain open. Note that in an exemplary embodiment, the switches 221c and 221d represent four possible states, thus providing four levels of capacitive tuning. These might, for example, represent four tuning states—untuned/open, resonant, close to resonant but slightly capacitive and close to resonant but slightly inductive.

In an exemplary embodiment, any of the switches 221 can be implemented using a field effect transistor (FET) a bipolar transistor, or another type of switching device. When there is a series capacitor in the parasitic antenna 213, such as the embodiments shown in FIGS. 4C and 4F, then a single FET or bipolar device can be used, since the capacitor can prevent unidirectional current from flowing through the device's body diode. When there is no series capacitor, such as the embodiments shown in FIGS. 4B, 4D and 4E then two devices (back to back series FETs for example) can be used for each switch 221 to block current in both directions.

Figure 4G:
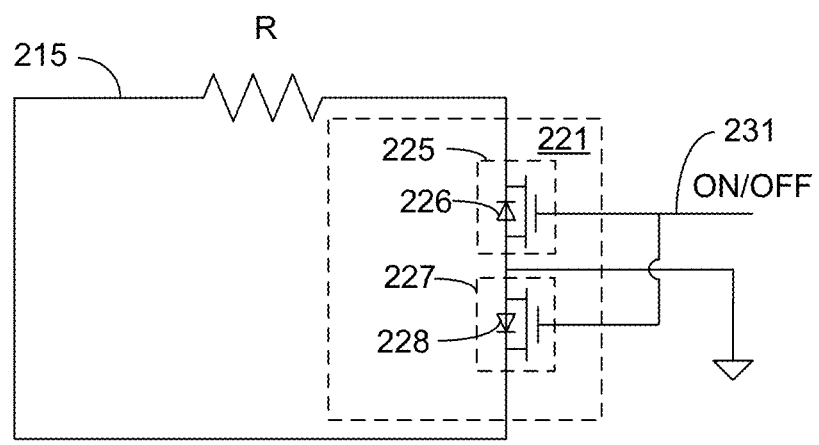
FIG. 4G is a schematic diagram illustrating an exemplary embodiment of a switch of FIGS. 4B through 4F.

FIG. 4G is a schematic diagram showing an example of a switch 221 implemented in a resistive parasitic antenna 215. The resistive parasitic antenna 215 is similar to the embodiments shown in FIG. 4E; however, the switch 221 shown in FIG. 4G can be implemented in any embodiment that does not have a capacitor shown herein. In an exemplary embodiment, the switch 221 comprises a FET 225 and a FET 227. The FET 225 is shown as having a body diode 226 and the FET 227 is shown as having a body diode 228. In an embodiment where there is no series capacitor, the two FETS 225 and 227 prevent unidirectional current from flowing through the parasitic antenna 215 because the body diode 226 and the body diode 228 each prevent current flow through the FET 225 and the FET 227 in a different direction. In an implementation having a capacitor in series with the switch, a single FET may be used as the switch 221. A control signal from the controller 214 brings the ON/OFF connection 231 high to make the FET 225 and the FET 227 conductive and close the switch 221.

Figure 5:
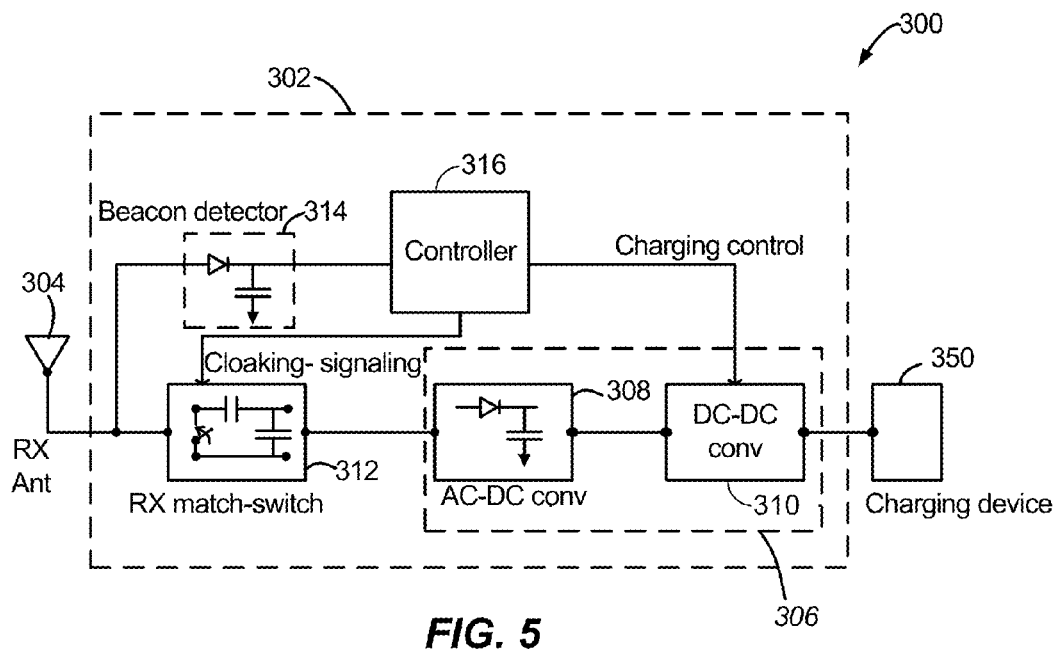
FIG. 5 is a simplified block diagram of a receiver, in accordance with an exemplary embodiment.

FIG. 5 is a simplified block diagram of a receiver 300, in accordance with an exemplary embodiment. The receiver 300 includes receive circuitry 302 and a receive antenna 304. Receiver 300 further couples to device 350 for providing received power thereto. It should be noted that receiver 300 is illustrated as being external to device 350 but may be integrated into device 350. Generally, energy is propagated wirelessly to receive antenna 304 and then coupled through receive circuitry 302 to device 350.

Receive antenna 304 is tuned to resonate at the same frequency, or within a specified range of frequencies, as transmit antenna 204 (FIG. 4A). Receive antenna 304 may be similarly dimensioned with transmit antenna 204 or may be differently sized based upon the dimensions of the associated device 350. By way of example, device 350 may be a portable electronic device having diametric or length dimension smaller that the diameter of length of transmit antenna 204. In such an example, receive antenna 304 may be implemented as a multi-turn antenna in order to reduce the capacitance value of a tuning capacitor (not shown) and increase the receive antenna's impedance. By way of example, receive antenna 304 may be placed around the substantial circumference of device 350 in order to maximize the antenna diameter and reduce the number of loop turns (i.e., windings) of the receive antenna and the inter-winding capacitance.

Receive circuitry 302 provides an impedance match to the receive antenna 304. Receive circuitry 302 includes power conversion circuitry 306 for converting a received energy into charging power for use by device 350. Power conversion circuitry 306 includes an AC-to-DC converter 308 and may also in include a DC-to-DC converter 310. AC-to-DC converter 308 rectifies the energy signal received at receive antenna 304 into a non-alternating power while DC-to-DC converter 310 converts the rectified energy signal into an energy potential (e.g., voltage) that is compatible with device 350. Various AC-to-DC converters are contemplated, including partial and full rectifiers, regulators, bridges, doublers, as well as linear and switching converters.

Receive circuitry 302 may further include RX match and switching circuitry 312 for connecting receive antenna 304 to the power conversion circuitry 306 or alternatively for disconnecting the power conversion circuitry 306. Disconnecting receive antenna 304 from power conversion circuitry 306 not only suspends charging of device 350, but also changes the "load" as "seen" by the transmitter 200 (FIG. 2).

As disclosed above, transmitter 200 includes load sensing circuit 216 which detects fluctuations in the bias current provided to transmitter power amplifier 210. Accordingly, transmitter 200 has a mechanism for determining when receivers are present in the transmitter's near-field.

When multiple receivers 300 are present in a transmitter's near-field, it may be desirable to time-multiplex the loading and unloading of one or more receivers to enable other receivers to more efficiently couple to the transmitter. Furthermore, this switching between unloading and loading controlled by receiver 300 and detected by transmitter 200 provides a communication mechanism from receiver 300 to transmitter 200. Additionally, a protocol can be associated with the switching which enables the sending of a message from receiver 300 to transmitter 200. By way of example, a switching speed may be on the order of 100 μsec.

In an exemplary embodiment, communication between the transmitter 200 and the receiver 300 refers to a device sensing and charging control mechanism. In other words, the transmitter 200 may use on/off keying of the transmitted signal to adjust whether energy is available in the near-field. The receivers interpret these changes in delivered power as a message from the transmitter 204. From the receiver side, the receiver 300 may use tuning and de-tuning of the receive antenna 304 to adjust how much power is being accepted from the near-field. The transmitter 204 can detect this difference in power used from the near-field and interpret these changes as a message from the receiver 304. It is noted that other forms of modulation of the transmit power and the load behavior may be utilized.

Receive circuitry 302 may further include signaling detector and beacon circuitry 314 used to identify received energy fluctuations, which may correspond to informational signaling from the transmitter to the receiver. Furthermore, signaling and beacon circuitry 314 may also be used to detect the transmission of a reduced signal energy (i.e., a beacon signal) and to rectify the reduced signal energy into a nominal power for awakening either un-powered or power-depleted circuits within receive circuitry 302 in order to configure receive circuitry 302 for wireless charging.

Receive circuitry 302 further includes controller 316 for coordinating the processes of receiver 300 described herein including the control of switching circuitry 312 described herein. The controller 316 may also be referred to as a processor. Controller 316 may monitor beacon circuitry 314 to determine a beacon state and extract messages sent from the transmitter. Controller 316 may also adjust DC-to-DC converter 310 for improved performance.

Various exemplary embodiments, as described herein, relate to systems, devices, and methods for controlling a field distribution of a wireless power system, via one or more parasitic antennas. More specifically, exemplary embodiments of the invention may enable for enhanced coupling efficiency, less thermal problems, and improved charging times. Furthermore, exemplary embodiments may enable for an increased charging area for supporting more chargeable devices, thus, enhancing user experience without impacting efficiency and charge time and/or reducing overall emissions. It is noted that the terms "parasitic coil" "parasitic loop" and "parasitic antenna" may be used herein interchangeably.

According to one exemplary embodiment, a detuned and shorted parasitic antenna (i.e., a dead short parasitic antenna), which is positioned proximate a transmit antenna, may generate, due to an induced current, a field (e.g., a magnetic field) that opposes a field (e.g., a magnetic field) generated by the transmit antenna. Accordingly, in this exemplary embodiment, an area within the parasitic antenna may be void of a magnetic field and the self-inductance of the transmit antenna may be reduced. Furthermore, according to another exemplary embodiment, the parasitic antenna may be opened (i.e., open-circuited) (e.g., via a switch) and, therefore, may not induce an effect on the transmit antenna or a magnetic field distribution proximate the transmit antenna.

According to another exemplary embodiment, one or more parasitic antennas having a fixed reactance (e.g., capacitance) and positioned proximate a transmit antenna, may induce current therein to modify a magnetic field generated by the transmit antenna.

According to another exemplary embodiment, one or more parasitic antennas may be configured to operate in a resonantly tuned state. When configured to operate in a resonantly tuned state, the one or more parasitic antennas may attenuate, may pass without modification, or may amplify the magnetic field generated by the transmit antenna.

According to another exemplary embodiment, one or more parasitic antennas may be configured to operate in a resistive state. For example, a resistor may be coupled to the parasitic antenna. When configured in a resistive state, the one or more parasitic antennas may attenuate the magnetic field generated by the transmit antenna.

According to another exemplary embodiment, one or more parasitic antennas may be configured to operate in a capacitive tuned state. For example, a capacitance may be coupled to the parasitic antenna. When configured in a capacitive tuned state, the one or more parasitic antennas may attenuate the magnetic field or may cause a predominately capacitive load to be presented to the transmit antenna.

According to another exemplary embodiment, one or more parasitic antennas may be configured to operate in an inductive tuned state. For example, an inductance may be coupled to the parasitic antenna. When configured in an inductive tuned state, the one or more parasitic antennas may attenuate the magnetic field or may cause a predominately inductive load to be presented to the transmit antenna.

As described more fully below, one or more parasitic antennas may be positioned proximate a transmit antenna in a row array, a column array, or any combination thereof (i.e., a dual layer with overlapping row and column arrays). Furthermore, parasitic antennas may be positioned proximate a transmit antenna in a grid array, which may comprise one or more layers. Moreover, the one or more parasitic antennas may be positioned above a transmit antenna, below the transmit antenna, or co-planar with the transmit antenna.

The parasitic antennas may be the same size as an associated transmit antenna, smaller than the transmit antenna, or larger than the transmit antenna. The one or more parasitic antennas may comprise a single turn or multiple turns. It is noted that a shorted parasitic antenna, according to an exemplary embodiment, may have a substantially similar detuning effect (reduction on transmitting coil self-inductance) as an electronic device (e.g., a mobile telephone) of substantially similar size.

In an exemplary embodiment, good coupling may be obtained by shorting all parasitic antennas not having a compatible receiver within an associated loop and opening each parasitic antenna having at least one compatible receiver within the associated loop. It is noted that the cumulative detuning effect of each receiver positioned within a charging region of the transmit antenna and shorted parasitic antenna is reduced via this method. Therefore, the change in the self-inductance of the transmit antenna may be limited regardless of the number of receivers being placed within an associated charging region.

As noted above, according to another exemplary embodiment, one or more parasitic antennas, wherein each parasitic antenna has a fixed reactance, may be integrated within a wireless power transmitter to enable a magnetic field distribution of the wireless power transmitter to be modified (e.g., even out the magnetic field distribution). The loops of the parasitic antennas may be smaller than the externally excited coil (i.e., the transmit antenna) to improve magnetic field distribution or steer the field in the desirable zone. Furthermore, loops of the parasitic antennas may be larger than the externally excited coil to increase effective charging area. The one or more parasitic antennas may be arranged in a concentric layout to improve overall field distribution or a non-concentric layout to improve field distribution in a specific zone. Further, the one or more parasitic antennas may be of a single turn winding or multiple turns winding.

The extent of the effect of the one or more parasitic antennas on a magnetic field generated by a transmit antenna may be dependent on a current induced in the parasitic antenna, which may depend on the mutual inductance between the parasitic antennas and the transmit antenna. This current may be controlled by a size of the parasitic antenna (i.e., larger size equals more voltage potential to drive current), a number of turns of the parasitic antenna (i.e., more turns equals more voltage potential to drive current), a distance (i.e., vertical and lateral) between the parasitic antenna and the transmit antenna (i.e., closer equals higher mutual inductance, hence more voltage potential to drive current), and a distance between the parasitic antenna and a charging surface of a wireless power transmitter (i.e., greater distance equal less affect).

As described more fully below, the one or more parasitic antenna may be positioned above the transmit antenna to improve mutual coupling (resulting in increased efficiency) to receivers further away from an associated charging surface. Further, the one or more parasitic antenna may be co-planar with the transmit antenna to reduce transmitter profile. Moreover, the one or more parasitic antenna may be positioned below the transmit antenna to reduce the extent of field alteration.

It is noted that one or more capacitor values across a parasitic antenna may control the phase difference between a transmit antenna and the parasitic antenna. Accordingly, the value of the capacitor across a parasitic antenna may be selected for a desirable response. An extremely small capacitor (similar to an open circuit) may have a minimal impact on overall field distribution. A capacitor having an extremely large value (similar to a short circuit) may achieve minimum field strength in the middle of the respective parasitic antenna and maximum field strength in the region outside the respective parasitic antenna of a concentric layout. A capacitor that has a value less than a value of a capacitor that drives the resonance frequency to the operating frequency may achieve substantial even field distribution for a concentric layout by reducing field strength in the region outside the respective parasitic antenna and increasing field strength in the region inside the respective parasitic antenna. A capacitor that has a value equal to a value of a capacitor that drives the resonance frequency to the operating frequency may achieve maximum field strength in the middle of the respective parasitic antenna and minimum field strength in the region outside the respective parasitic antenna for a concentric layout. A capacitor that has a capacitor value greater than a value of a capacitor that drives the resonance frequency to the operating frequency may achieve weaker field strength in the region inside the respective parasitic antenna and stronger field strength in the region outside the respective parasitic antenna. It is noted that additional capacitors can be switched into parasitic antennas to actively steer the magnetic field into a desirable region and away from an undesirable region.

Table 1 below further illustrates the effect of capacitor values on a current in a parasitic antenna and field distribution of a wireless power transmitter.

TABLE 1

| Capacitance value | Current in the parasitic antenna | Field inside the parasitic antenna | Field outside the parasitic antenna |
| --- | --- | --- | --- |
| Parasitic antenna is open-circuited | No current | No change | No change |

TABLE 1-continued

| Capacitance value | Current in the parasitic antenna | Field inside the parasitic antenna | Field outside the parasitic antenna |
| --- | --- | --- | --- |
| Resonance greater than operating frequency (Inductive tuned state) | Slightly out of phase | Strengthened | Weakened |
| Resonance equal to operating frequency (Resonant tuned state) | In phase with current in transmit antenna | Maximum | Minimum |
| Resonance less than operating frequency (Capacitive tuned state) | Slightly out of phase | Weakened | Strengthened |
| Parasitic antenna is close-circuited | 180° out of phase with current in transmit antenna | Minimum | Maximum |
| Parasitic antenna is placed in resistive state | 180° out of phase with current in transmit antenna | Weakened | No change |

Figure 6C:
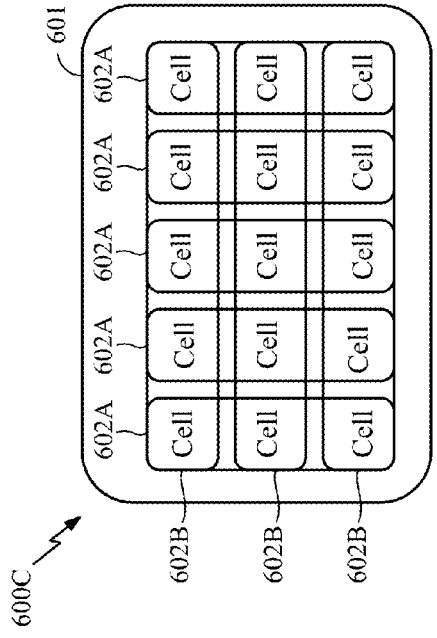
FIG. 6C illustrates another wireless power transmitter including a transmit antenna and a plurality of parasitic antennas in a first direction and another plurality of parasitic antennas in a second direction, in accordance with an exemplary embodiment.
Figure 6D:
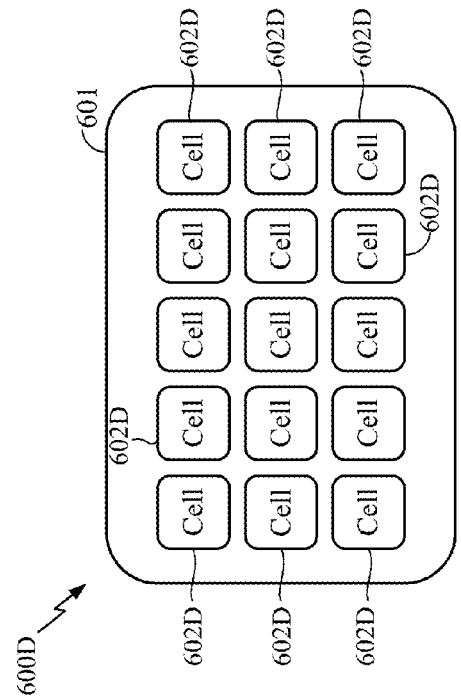
FIG. 6D illustrates yet another wireless power transmitter including a transmit antenna and a multi-dimensional array of parasitic antennas, according to an exemplary embodiment.
Figure 6A:
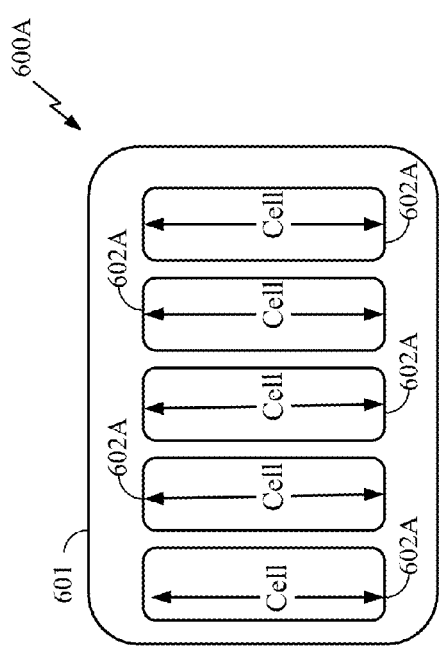
FIG. 6A illustrates a wireless power transmitter including a transmit antenna and a plurality of parasitic antennas, according to an exemplary embodiment.
Figure 6B:
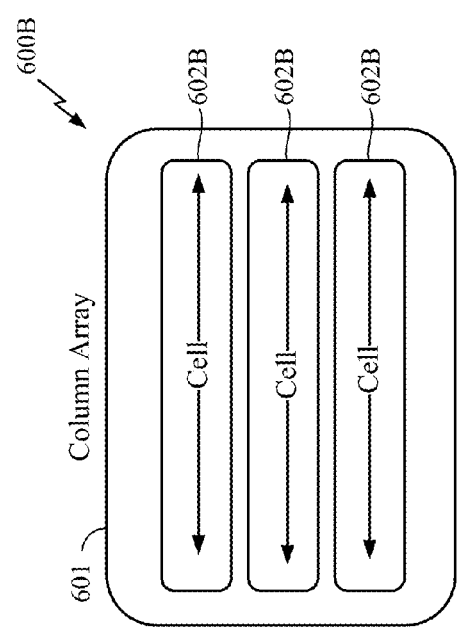
FIG. 6B illustrates another wireless power transmitter including a transmit antenna and a plurality of parasitic antennas, in accordance with an exemplary embodiment.

Various exemplary embodiments will now be described with reference to FIGS. 6A-25. FIG. 6A illustrates a wireless power transmitter 600A including a transmit antenna 601 and a plurality of parasitic antennas 602A, according to an exemplary embodiment. FIG. 6B illustrates a wireless power transmitter 600B including a transmit antenna 601 and a plurality of parasitic antennas 602B, according to another exemplary embodiment. Parasitic antennas 602A illustrated in FIG. 6A are positioned in a column array and parasitic antennas 602B illustrated in FIG. 6B are positioned in a row array. FIG. 6C illustrates a wireless power transmitter 600C, according to yet another exemplary embodiment. Wireless power transmitter 600C includes transmit antenna 601, a plurality of parasitic antennas 602A, which are in a column array, and a plurality of parasitic antennas 602B, which are in a row array. Parasitic antennas 602A and parasitic antennas 602B are in a dual-layer configuration. Another exemplary embodiment is illustrated in FIG. 6D, which depicts a wireless power transmitter 600D including transmit antenna 601 and a plurality of parasitic antennas 602D arranged in a row and column array. It is noted that, as used herein and as illustrated in FIGS. 6A-6D, a "cell" is the smallest possible area that can be controlled by one or more parasitic antennas.

Figure 7A:
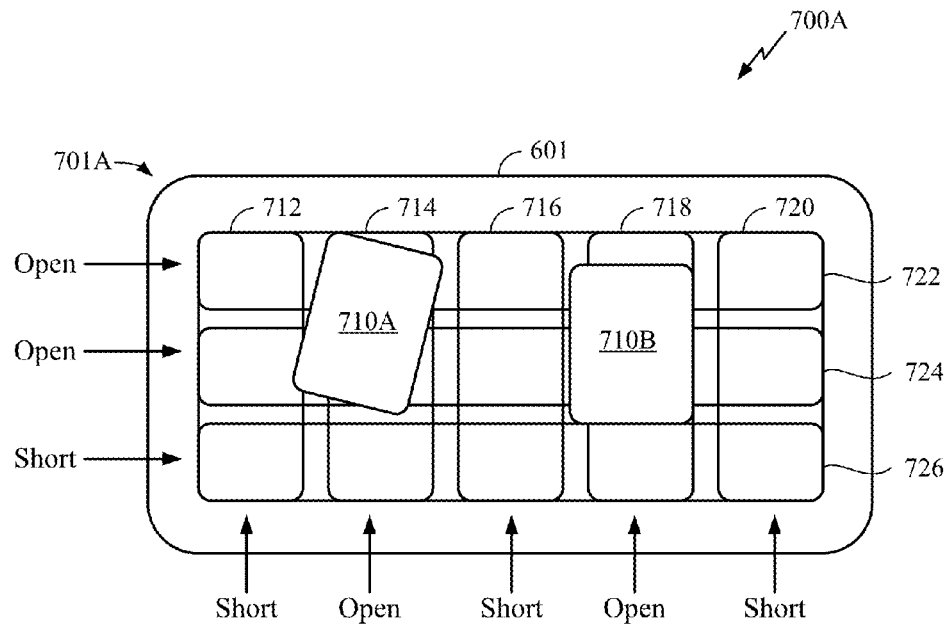
FIG. 7A illustrates a wireless power system including a wireless power transmitter and a plurality of wireless power receivers, in accordance with an exemplary embodiment.

FIG. 7A illustrates an example of a wireless power system 700A including a wireless power transmitter 701A including a plurality of parasitic antennas 712, 714, 716, 718, and 720 and another plurality of parasitic antennas 722, 724, and 726 in a dual-layer configuration. More specifically, wireless power transmitter 701A includes parasitic antennas 712, 714, 716, 718, and 720, which are positioned in one direction (i.e., parallel to one another), and parasitic antennas 722, 724, and 726, which are positioned in another direction (i.e., parallel to one another and perpendicular to parasitic antennas 712, 714, 716, 718, and 720). Moreover, wireless power system 700A includes a first wireless power receiver 710A and a second wireless power receiver 710B. In an example wherein each of first wireless power receiver 710A and a second wireless power receiver 710B comprise a compatible device, wireless power transmitter 701A may open each of parasitic antennas 722, 724, 714, and 718 and short each of parasitic antennas 712, 716, 720, and 726. Accordingly, areas within any of parasitic antennas 712, 716, 720, and 726 may comprise a null field zone. Accordingly, in this example, receiver 710A or receiver 710B may receive power generated by transmit antenna 601. As used herein, a "compatible device" is a device having a wireless power receiver configured to wirelessly receive power from a wireless power transmitter, such as the wireless power transmitter 701A and the other embodiments thereof.

Figure 7B:
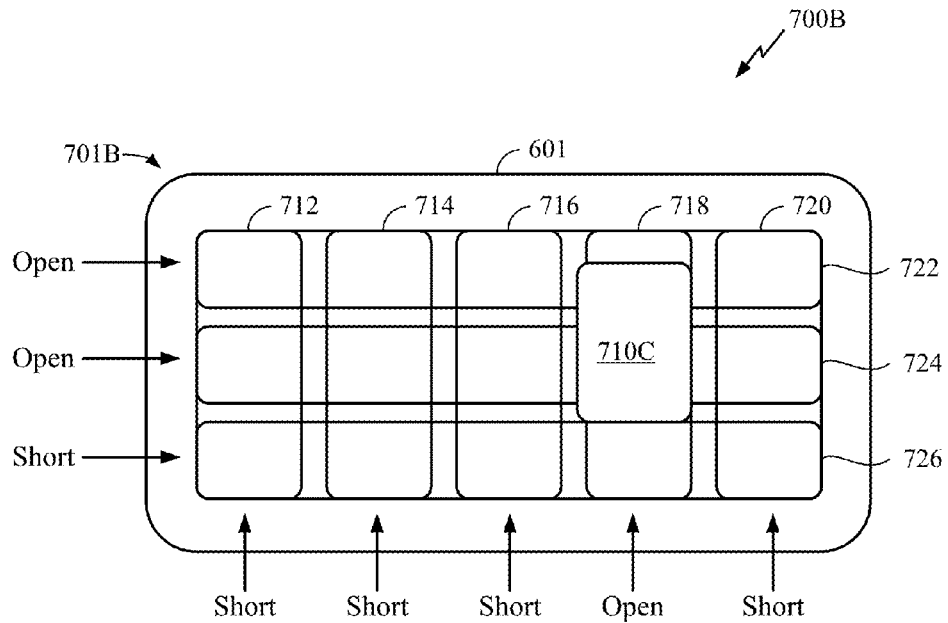
FIG. 7B illustrates another wireless power system including a wireless power transmitter and a wireless power receiver, according to an exemplary embodiment.

FIG. 7B illustrates another example wireless power system 700B including a wireless power transmitter 701B including a plurality of parasitic antennas 712, 714, 716, 718, and 720 and another plurality of parasitic antennas 722, 724, and 726 in a dual-layer configuration. More specifically, wireless power transmitter 701B includes parasitic antennas 712, 714, 716, 718, and 720, which are positioned in one direction (i.e., parallel to one another), and parasitic antennas 722, 724, and 726, which are positioned in another direction (i.e., parallel to one another and perpendicular to parasitic antennas 712, 714, 716, 718, and 720). Moreover, wireless power system 700B includes a wireless power receiver 710C. In an example wherein wireless power receiver 710C comprises a compatible device, wireless power transmitter 700B may open each of parasitic antennas 718, 722 and 724 and short each of parasitic antennas 712, 714, 716, 720, and 726. Accordingly, areas within any of parasitic antennas 712, 714, 716, 720, and 726 may comprise a null field zone. Accordingly, in this example, receiver 710C may receive power generated by transmit antenna 601.

Figure 8A:
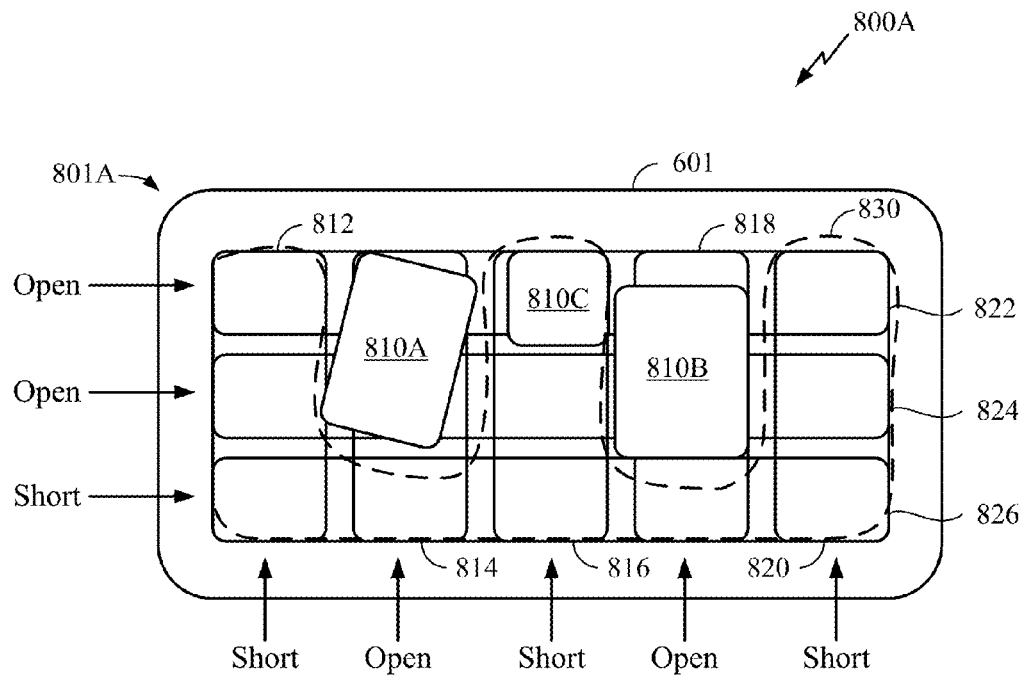
FIG. 8A illustrates a wireless power system including a wireless power transmitter and a plurality of wireless power receivers including a non-compatible receiver, according to an exemplary embodiment.

FIG. 8A illustrates an example of a wireless power system 800A including a wireless power transmitter 801A including a plurality of parasitic antennas 812, 814, 816, 818, and 820 and another plurality of parasitic antennas 822, 824, and 826. Similarly to wireless power transmitter 701A, wireless power transmitter 801A includes parasitic antennas 812, 814, 816, 818, and 820, which are positioned in one direction (i.e., parallel to one another), and parasitic antennas 822, 824, and 826, which are positioned in another direction (i.e., parallel to one another and perpendicular to parasitic antennas 802A). Moreover, wireless power system 800A includes a first wireless power receiver 810A and a second wireless power receiver 810B, each of which, in this example, comprise compatible devices. Furthermore, wireless power system 800A includes a device 810C, which, in this example, comprises a non-compatible device, such as a near-field communication (NFC) device, a rogue receiver, a foreign object (such as a metal object or another object that may affect the magnetic field), or a wireless power receiver that may operate on a wireless power transfer protocol different than a wireless power transfer protocol used by the wireless power transmitter 801A. During a contemplated operation of wireless power system 800A, the wireless power transmitter may open each of parasitic antennas 814, 818, 822, and 824 and short (including, for example, activate or enable) each of parasitic antennas 812, 816, 820, and 826. As a result, areas within any of shorted parasitic antennas 812, 816, 820, and 826 may comprise null field zones. It is noted that device 810C is positioned within null field zone 830 and, therefore, power received by device 810C, if any, may be limited. Further, receiver 810A and receiver 810B are not within null field zone 830 and, therefore, may receive power generated by transmit antenna 601. Further, in an exemplary embodiment, it may be desirable to allow one wireless power receiver (such as wireless power receiver 810A) to receive a different amount of power than a second wireless power receiver (such as wireless power receiver 810B). For example, in an exemplary embodiment in which it may be desirable to transfer more power to wireless power receiver 810A than to wireless power receiver 810B, it may be desirable to control the parasitic antennas 814, and 822 to increase the magnetic field near the wireless power receiver 810A, while not affecting the magnetic field near wireless power receiver 810B, and to control the parasitic antennas 818 and 824 to decrease the magnetic field near the wireless power receiver 810B, while not affecting the magnetic field near wireless power receiver 810A. In such an exemplary embodiment, the parasitic antennas 814 and 822 may be set to be resonant to increase the H-field in the areas near the wireless power receiver 810A and the parasitic antennas 818 and 824 may be set to be non-resonant to decrease the H-field in the areas near the wireless power receiver 810B. In an exemplary embodiment, one or more parasitic antennas including the parasitic antenna may be incorporated in or with a housing defining a charging surface for placement of one or more charge-receiving devices including, for example, one or more of the wireless power receiver 810A and the wireless power receiver 810B. The housing may be configured to house the wireless transmit antenna and the plurality of parasitic antennas.

Figure 8B:
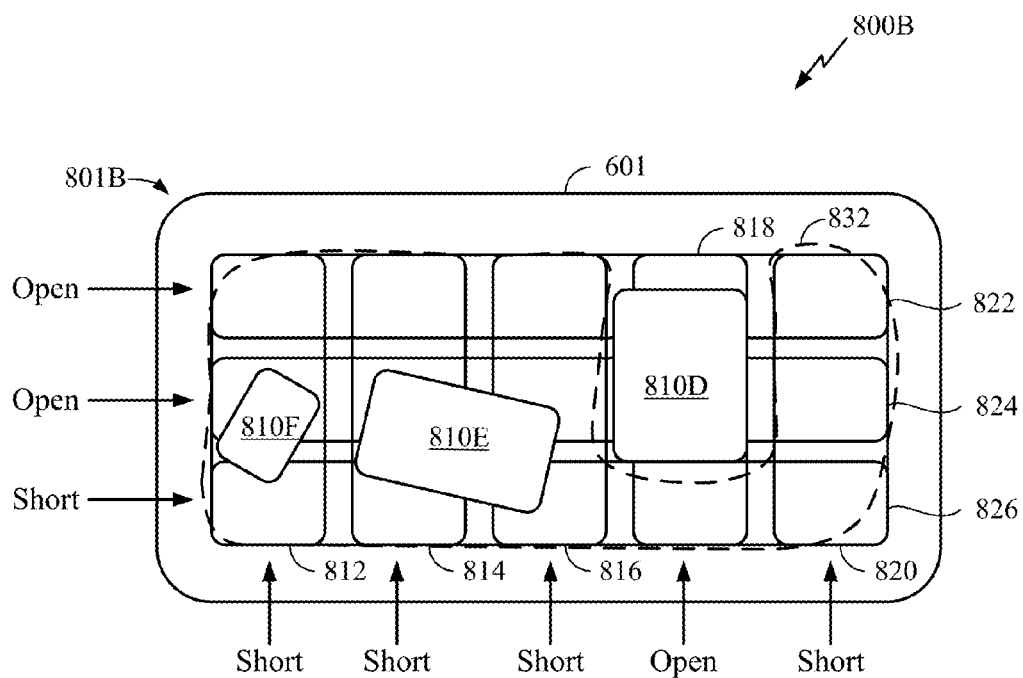
FIG. 8B illustrates a wireless power system including a wireless power transmitter and a plurality of wireless power receivers including a plurality of non-compatible receivers, in accordance with an exemplary embodiment.

FIG. 8B illustrates an example of a wireless power system 800B including a wireless power transmitter 801B including parasitic antennas 812, 814, 816, 818, 820, 822, 824, and 826. Similarly to wireless power transmitter 801A, wireless power parasitic antennas 812, 814, 816, 818, and 820 are positioned in one direction (i.e., parallel to one another), and parasitic antennas 822, 824, and 826 are positioned in another direction (i.e., parallel to one another and perpendicular to parasitic antennas 802A). Moreover, wireless power system 800B includes wireless power receiver 810D, which, in this example, comprises a compatible device. Furthermore, wireless power system 800A includes a device 810E and a device 810F, each of which, in this example, comprise an incompatible device, such as a near-field communication (NFC) device or a rogue receiver. During a contemplated operation of wireless power system 800B, the wireless power transmitter may open each of parasitic antennas 818, 822, and 824 and short each of parasitic antennas 812, 814, 816, 820, and 826. As a result, areas within any of shorted parasitic antennas 812, 814, 816, 820, and 826 may comprise null field zones. It is noted that device 810E and device 810F are positioned within null field zone 832 and, therefore, power received by either device 810E or device 810F, if any, may be limited. Further, receiver 810D is not within null field zone 832 and, therefore, may receive power generated by transmit antenna 601.

Figure 9:
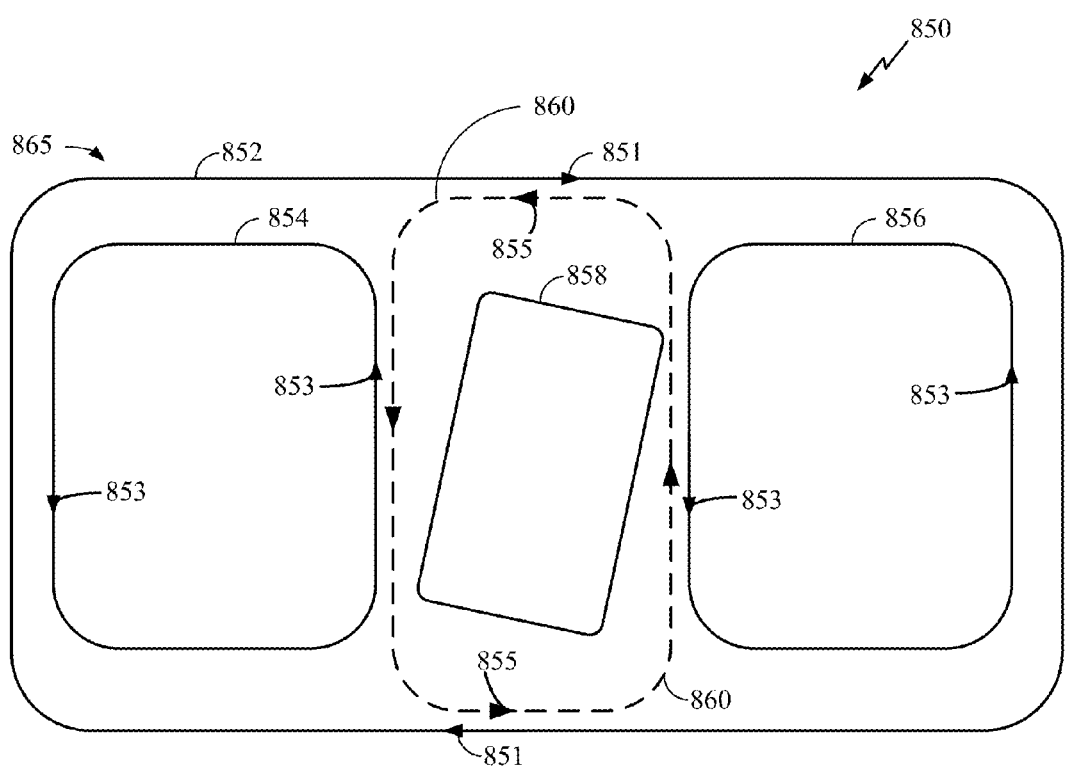
FIG. 9 illustrates a wireless power system including a wireless power transmitter, a plurality of parasitic antennas, and a compatible receiver, according to an exemplary embodiment.

FIG. 9 illustrates a wireless power system 850 including a wireless power transmitter 865 including transmit antenna 852, a parasitic antenna 854, and a parasitic antenna 856. Wireless power system 850 also includes receiver 858 positioned within a charging region of wireless power transmitter 865. With reference to FIG. 9, parasitic antenna 854 and parasitic antenna 856, each of which are short-circuited and adjacent to transmit antenna 852, have an induced current which opposes a magnetic field generated by transmit antenna 852. A current within transmit antenna 852 is in the direction depicted by arrows 851 and currents within parasitic antenna 854 and parasitic antenna 856 are in the direction depicted by arrows 853. Further, a current within a region 860 is in the direction depicted by arrows 855. Accordingly, a magnetic field within each of parasitic antenna 854 and parasitic antenna 856 may be reduced and a magnetic field within region 860 may be enhanced and, therefore, coupling efficiency may be improved. It is noted that the parasitic antennas illustrated in FIGS. 6A-9 comprise "dead-shorted" parasitic antennas.

As will be understood by a person having ordinary skill in the art, the one or more tuned parasitic antennas may re-couple the energy from the transmit antenna to a receiver via the mutual inductance between the one or more parasitic antennas and the transmit antenna and the mutual inductance between the one or more parasitic antennas and a receive antenna of a receiver. The increase in coupling decreases as the one or more parasitic antennas are located further away from the receiver. Therefore, the one or more parasitic antennas may be appropriately sized and spaced to achieve optimum performance across a range of devices.

According to one exemplary embodiment, a wireless power transmitter may be configured to detect a presence of a compatible device (i.e., a wirelessly chargeable device). Furthermore, the wireless power transmitter may be configured to determine a location of a detected compatible device. During one contemplated operation, a wireless power transmitter may periodically perform a system scan by shorting and opening each parasitic antenna, or a combination of fewer than all parasitic antennas, at different times to determine if a compatible device is within a respective cell. Additionally, a sudden drop in charging efficiency, or loss of communication with the receiver, may trigger a scan as a receiver may have been moved to a null field zone. Detection of a compatible device may be carried out by methods known in the art, such as monitoring the power transfer efficiency, unloaded receiver voltage, or both during a scan routine. Therefore, the transmitter may be aware of the location of each individual receiver.

Upon detecting one or more compatible device, and determining locations of the detected compatible devices, the wireless power transmitter may short all parasitic antennas not having at least one compatible device positioned therein to create a null field zone so that power transfer to a non-compatible device (e.g., an NFC card or rogue receiver) is minimal or possibly eliminated. Accordingly, as will be appreciated by a person having ordinary skill in the art, a field generated by transmitter may be enhanced in areas which do not fall into the null field zone, thus coupling efficiency may be improved.

As previously noted, a wireless power transmitter may include a transmit antenna and one or more parasitic antennas, wherein at least one parasitic antenna has a set impedance (i.e., not a dead short). A parasitic antenna including a set impedance, such as an antenna tuned via a capacitive element (i.e., capacitively loaded) or an inductive element (i.e., inductively loaded), may be used to modify a field distribution of a wireless power transmitter (e.g., steering field away from an undesired area or steering field into a desired area). For example, a parasitic antenna may expand a coverage area of a smaller transmit antenna, or concentrate a field of a larger transmit antenna.

FIGS. 10A-10G illustrate various example wireless power transmitter configurations wherein each configuration includes a transmit antenna and at least one parasitic antenna. Specifically, FIG. 10A illustrates a wireless power transmitter 900A including a transmit antenna 901A and concentric parasitic antenna 902A, which is smaller than transmit antenna 901A. FIG. 10B illustrates a wireless power transmitter 900B including a transmit antenna 901B and concentric parasitic antennas 902B1 and 902B2, wherein each of parasitic antennas 902B 1 and 902B2 are smaller than transmit antenna 901B. FIG. 10C illustrates a wireless power transmitter 900C including a transmit antenna 901C and a concentric parasitic antenna 902C, wherein parasitic antenna 902C is larger than transmit antenna 901C. FIG. 10D illustrates a wireless power transmitter 900D including a transmit antenna 901D and non-concentric parasitic antenna 902D, wherein parasitic antenna 902D is smaller than transmit antenna 901D. FIG. 10E illustrates a wireless power transmitter 900E including a transmit antenna 901E and non-concentric parasitic antennas 902E1 and 902E2, wherein each of parasitic antennas 902E1 and 902E2 are smaller than transmit antenna 901E. FIG. 10F illustrates a wireless power transmitter 900F including a transmit antenna 901F and concentric parasitic antenna 902F1, which is smaller than transmit antenna 901F. Wireless power transmitter 900F further includes a non-concentric parasitic antenna 902F2, which is smaller than parasitic antennas 902F1. FIG. 10G illustrates a wireless power transmitter 900G including a transmit antenna 901G and concentric parasitic antenna 902G1, which is smaller than transmit antenna 901G. Wireless power transmitter 900F further includes non-concentric parasitic antennas 902G2 and 902G3, each of which is smaller than parasitic antennas 902G1.

FIGS. 11A-11C illustrate cross-sectional views of various example wireless power transmitter configurations wherein each configuration includes a transmit antenna 921 and a parasitic antenna 922. FIG. 11A illustrates a wireless power transmitter 920A including a transmit antenna 921 and parasitic antenna 922, which is positioned below transmit antenna 921. FIG. 11B illustrates a wireless power transmitter 920B including transmit antenna 921 and parasitic antenna 922, which is co-planar with transmit antenna 921. FIG. 11C illustrates a wireless power transmitter 920C including a transmit antenna 921 and parasitic antenna 922, which is positioned above transmit antenna 921.

FIGS. 12A-12E illustrate various relationship between a current within a transmit antenna and a current within a parasitic antenna. It is noted that a phase relation between a current within a transmit antenna and the current in a parasitic antenna may determine whether a field (e.g., a magnetic field) within the parasitic antenna is decreased or increased.

Figure 12A:
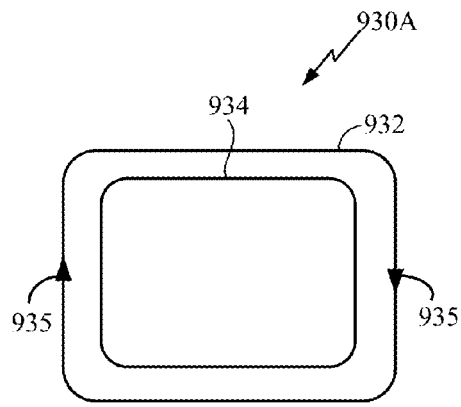
FIGS. 12A-12E illustrate various relationship between a current within a transmit antenna and a current within a parasitic antenna, according to an exemplary embodiment.

FIG. 12A illustrates a wireless power transmitter 930A including a transmit antenna 932 and a parasitic antenna 934. A current within transmit antenna 932 is in the direction depicted by arrows 935. In this embodiment, parasitic antenna 934 is open-circuited and, therefore, parasitic antenna 934 lacks a current.

Figure 12B:
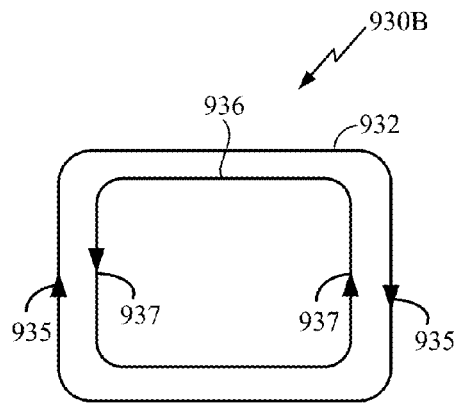

FIG. 12B illustrates a wireless power transmitter 930B including transmit antenna 932 and a parasitic antenna 936. A current within transmit antenna 932 is in the direction depicted by arrows 935 and current within parasitic antenna 936 is in the direction depicted by arrows 937. In this embodiment, a capacitance of parasitic antenna 936 is less than a capacitance that will cause parasitic antenna 936 to be in resonance at the operating frequency and a current within parasitic antenna 936 is out of phase and in the opposite direction as a current within transmit antenna 932. This state may also be referred to as an inductive tuned state.

Figure 12C:
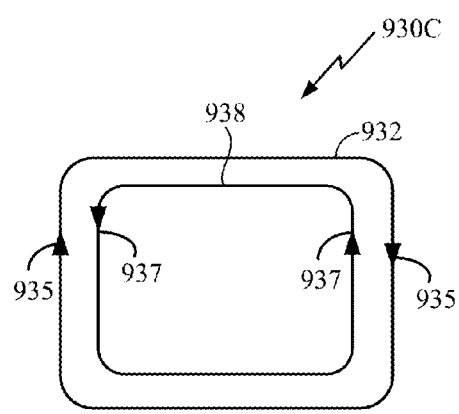

FIG. 12C illustrates a wireless power transmitter 930C including transmit antenna 932 and a parasitic antenna 938. A current within transmit antenna 932 is in the direction depicted by arrows 935 and current within parasitic antenna 938 is in the direction depicted by arrows 937. In this embodiment, a capacitance of parasitic antenna 938 is equal to a capacitance that will cause parasitic antenna 938 to be in resonance at the operating frequency and the current within parasitic antenna 938 is 180 degrees out of phase and in the opposite direction as the current within transmit antenna 932.

Figure 12D:
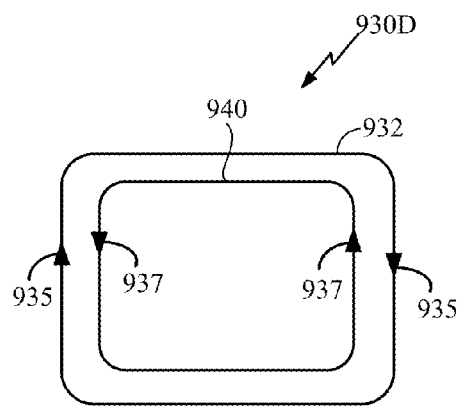

FIG. 12D illustrates a wireless power transmitter 930D including transmit antenna 932 and a parasitic antenna 940. A current within transmit antenna 932 is in the direction depicted by arrows 935 and the current within parasitic antenna 940 is in the direction depicted by arrows 937. In this embodiment, a capacitance of parasitic antenna 940 is greater than a capacitance that will cause parasitic antenna 940 to be in resonance at the operating frequency and the current within parasitic antenna 940 is out of phase and in an opposite direction as the current within transmit antenna 932. This state may also be referred to as a capacitive tuned state.

Figure 12E:
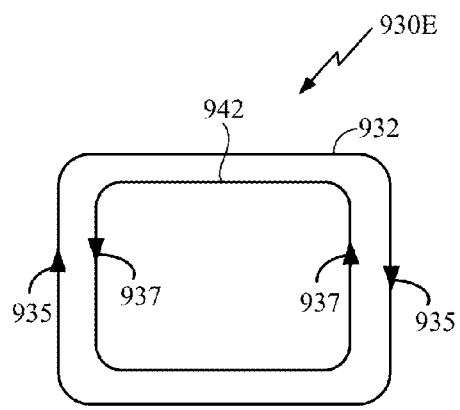

FIG. 12E illustrates a wireless power transmitter 930E including transmit antenna 932 and a parasitic antenna 942. A current within transmit antenna 932 is in the direction depicted by arrows 935 and a current within parasitic antenna 942 is in the direction depicted by arrows 937. In this embodiment, a capacitance of parasitic antenna 942 is very high (from a tuning perspective, similar to a short circuit) and the current within parasitic antenna 942 is 180 degrees out of phase with the current within transmit antenna 932.

It is noted that for enhanced field distribution control, the spacing between each parasitic antenna, including overlapping antennas, may be adjusted. Further, the size of the parasitic antennas and the spacing between parasitic antennas may vary depending on, for example, a size of an associated wireless power transmitter. Further, it is noted that various exemplary embodiments may improve the coupling efficiency and impedance responses by generating a more even magnetic field across the transmit antenna. In addition, by reducing the peak magnetic field within a charging region, potential thermal/fire hazard problems associated with NFC cards may be mitigated. By including active alteration of field distribution, a wireless power system may be able to steer the magnetic field away from a non-compatible device (e.g., an NFC card) and into a compatible receiver. Moreover, an effective charge area may be increased with minimal impact on coupling efficiency.

Figure 13:
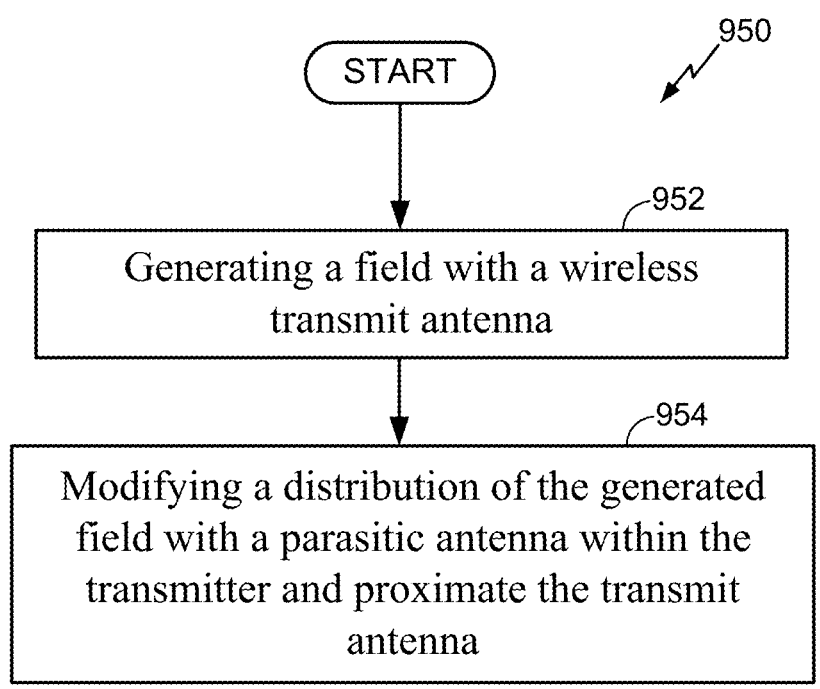
FIG. 13 is a flowchart illustrating a method for modifying a distribution of a generated field with a parasitic antenna, in accordance with an exemplary embodiment.

FIG. 13 is a flowchart illustrating a method 950 for modifying a distribution of a generated field with a parasitic antenna, in accordance with one or more exemplary embodiments. Method 950 may include generating a field with a wireless transmit antenna (depicted by numeral 952). Method 950 may further include modifying a distribution of the generated field with a parasitic antenna within the transmitter and proximate the transmit antenna (depicted by numeral 954).

Figure 14:
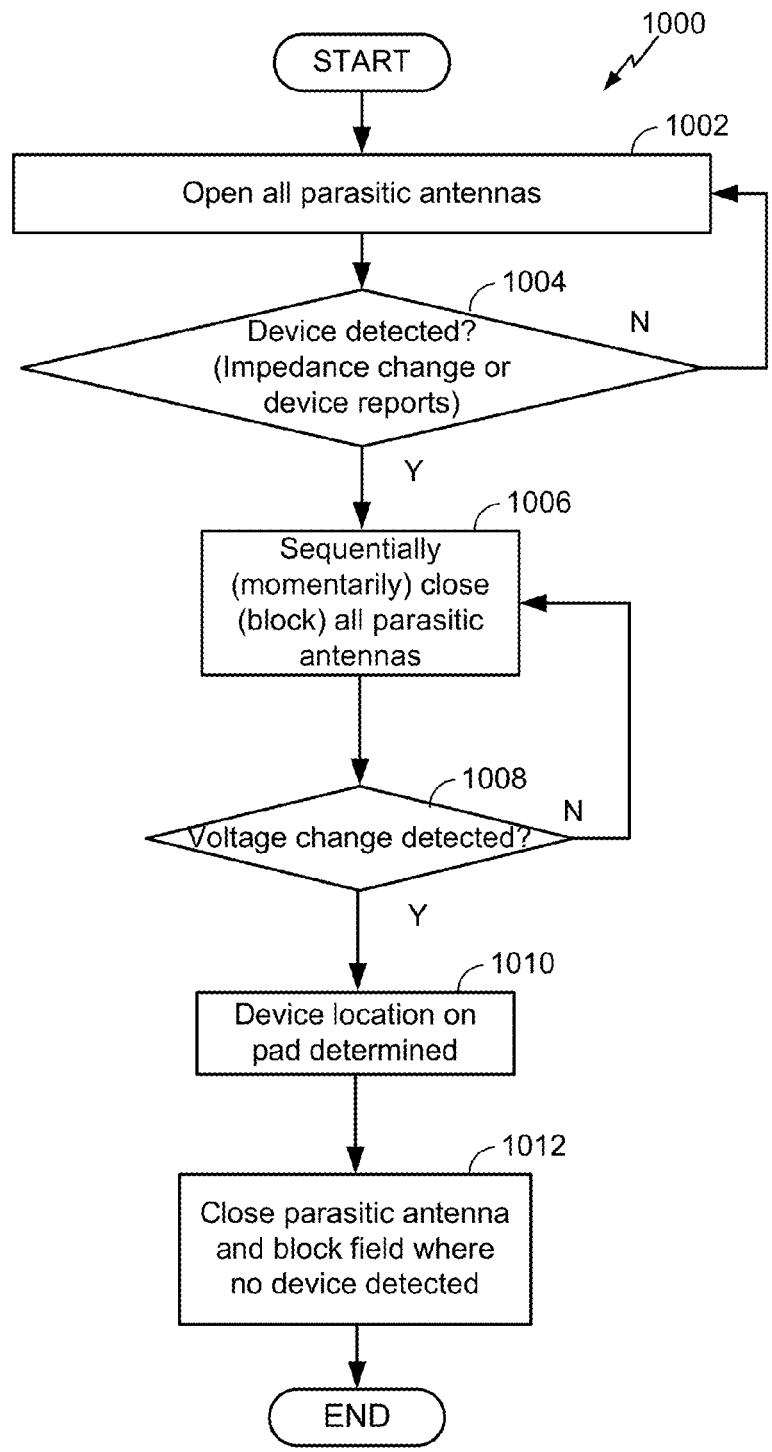
FIG. 14 is a flowchart illustrating another method for determining whether a wireless power receiver is located on a charging surface, in accordance with one or more exemplary embodiments.

FIG. 14 is a flowchart illustrating a method 1000 for determining whether a wireless power receiver is located on a charging surface, in accordance with one or more exemplary embodiments. The method 1000 shows an exemplary embodiment of determining whether a wireless power receiver is located on a charging surface, and if so detected, the location on the charging surface where the wireless power receiver is located. Determining whether a wireless power receiver is located on a charging surface, and if so detected, the location on the charging surface where the wireless power receiver is located may be used to efficiently and accurately determine which, if any, parasitic antennas to control the modify a wireless charging field. In block 1002, all parasitic antennas are opened, i.e., they have no current flowing in them.

In block 1004, it is determined whether there is a device located on the charging surface of a wireless power transmitter. The presence of a device on the charging surface of a wireless power transmitter can be determined by, for example, monitoring an impedance change at the transmitter, or by a communication from the receiver of a charging device over, for example, communication channel 119 (FIG. 2). If it is determined in block 1004 that there is no device located on the charging surface of a wireless charging transmitter, the process returns to block 1002. If it is determined in block 1004 that there is a device located on the charging surface of a wireless charging transmitter, the process proceeds to block 1006.

In block 1006, some or all of the parasitic antennas are momentarily and sequentially closed (e.g., be activated or enabled). Momentarily and sequentially closing some or all of the parasitic antennas can be used to determine the location on the charging surface where a device may be located.

In block 1008, an impedance change at the transmit antenna or the receive antenna is detected. In an exemplary embodiment, a change in a voltage parameter, such as a voltage change at the transmit antenna or the receive antenna is detected.

Whether detecting a change at the transmit antenna or the receive antenna, it is useful to detect a change in impedance, which can be used to detect a change in resistance and/or reactance. Both resistance and reactance can be measured directly. Resistance can also be measured indirectly by measuring voltage. For example, in the case where a pure current source is driving the transmit antenna, then a voltage change at the transmit antenna will be observed, or a voltage change at the receive antenna will be observed. A change detected at the receive antenna can be communicated to the transmitter using, for example, the communication channel 119 (FIG. 1), or another in-band or out-of-band communication channel.

For example, if a device is located proximate to the transmit antenna when the parasitic antenna is closed, then a voltage drop at the transmit antenna or the receive antenna, detected for example, by the controller 214 (FIG. 4) or by the controller 316 (FIG. 5), may indicate the presence of a device, such as, for example only, the receiver 810A and the receiver 810B of FIG. 8A. If no voltage change is detected in block 1008, then the process returns to block 1006 and the momentary and sequential closing of the parasitic antennas continues.

In block 1010, the voltage change is used to determine the location of the device on the charging surface.

In block 1012, parasitic antennas associated with locations on the charging surface having no device detected are closed thereby blocking the field where no device is detected.

Figure 15:
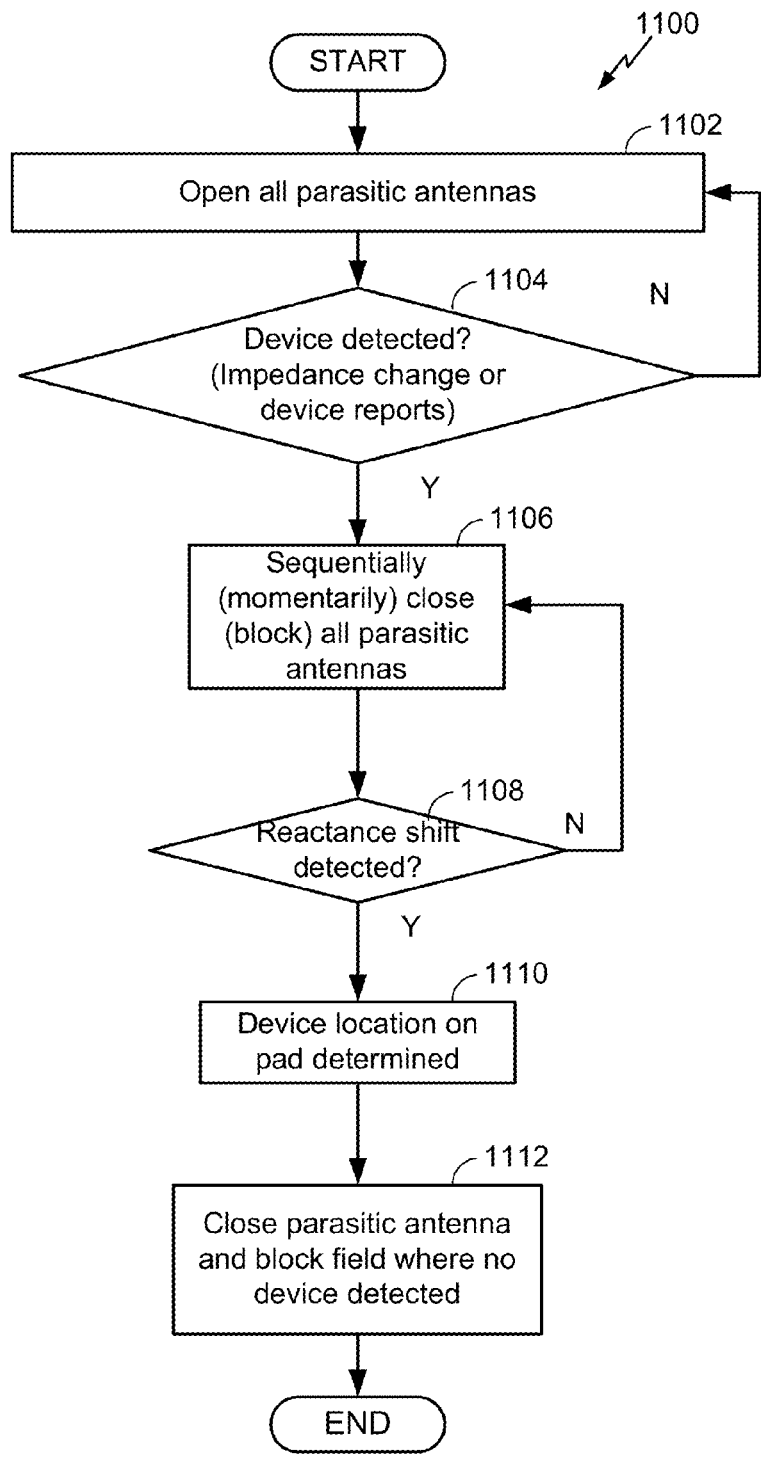
FIG. 15 is a flowchart illustrating another method for determining whether a wireless power receiver is located on a charging surface, in accordance with one or more exemplary embodiments.

FIG. 15 is a flowchart illustrating another method 1100 for determining whether a wireless power receiver is located on a charging surface, in accordance with one or more exemplary embodiments. The method 1100 shows an exemplary embodiment of determining whether a wireless power receiver is located on a charging surface, and if so detected, the location on the charging surface where the wireless power receiver is located. Determining whether a wireless power receiver is located on a charging surface, and if so detected, the location on the charging surface where the wireless power receiver is located may be used to efficiently and accurately determine which, if any, parasitic antennas to control the modify a wireless charging field. In block 1102, all parasitic antennas are opened, i.e., they have no current flowing in them.

In block 1104, it is determined whether there is a device located on the charging surface of a wireless power transmitter. The presence of a device on the charging surface of a wireless power transmitter can be determined by, for example, monitoring an impedance change at the transmitter, or by a communication from the receiver of a charging device over, for example, communication channel 119 (FIG. 2). If it is determined in block 1104 that there is no device located on the charging surface of a wireless charging transmitter, the process returns to block 1102. If it is determined in block 1104 that there is a device located on the charging surface of a wireless charging transmitter, the process proceeds to block 1106.

In block 1106, some or all of the parasitic antennas are momentarily and sequentially closed (e.g., be activated or enabled). Momentarily and sequentially closing some or all of the parasitic antennas can be used to determine the location on the charging surface where a device may be located.

In block 1108, a reactance shift is detected. For example, the controller 214 can monitor a reactance parameter, such as the reactance at the transmit antenna 204, or the controller 316 can monitor the reactance shift at the receive antenna 304. The reactance shift at the transmit antenna 204 can be indicative of the presence of a metal or metallic object on the charging surface. The reactance shift at the receive antenna 304 can be caused by the receive circuitry 302 or the metal case or enclosure of the object and can be communicated to the transmitter 104 over communication channel 119.

Whether detecting a change at the transmit antenna or the receive antenna, it is useful to detect a change in impedance, which can be used to detect a change in resistance and/or reactance. Both resistance and reactance can be measured directly. Resistance can also be measured indirectly by measuring voltage. For example, in the case where a pure current source is driving the transmit antenna, then a voltage change at the transmit antenna will be observed, or a voltage change at the receive antenna will be observed. A change detected at the receive antenna can be communicated to the transmitter using, for example, the communication channel 119 (FIG. 1), or another in-band or out-of-band communication channel.

For example, if a device is located proximate to the transmit antenna 204 when the parasitic antenna is closed, then a reactance shift at the transmit antenna 204, detected for example, by the controller 214 (FIG. 4), may indicate the presence of a device, such as, for example only, the receiver 810A and the receiver 810B of FIG. 8A. If no reactance shift is detected in block 1108, then the process returns to block 1106 and the momentary and sequential closing of the parasitic antennas continues.

In block 1110, the reactance shift is used to determine the location of the device on the charging surface.

In block 1112, parasitic antennas associated with locations on the charging surface having no device detected are closed thereby blocking the field where no device is detected.

Figure 16:
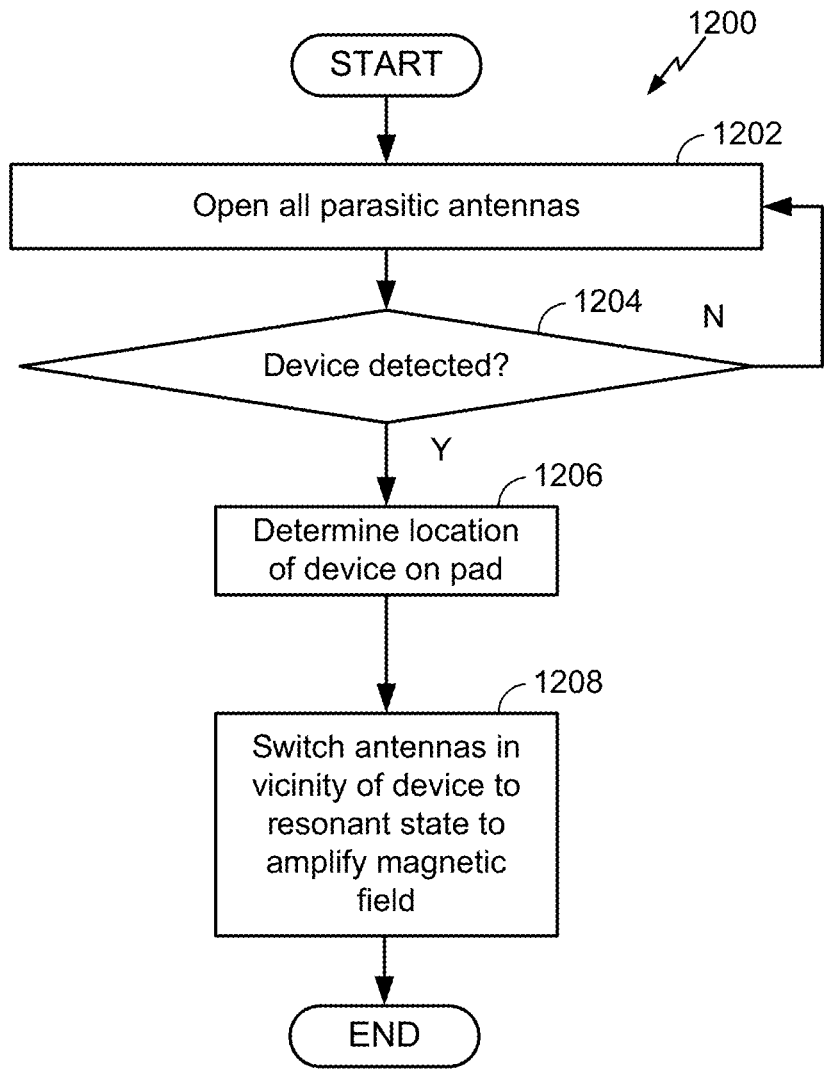
FIG. 16 is a flowchart illustrating a method for modifying a distribution of a generated field with a parasitic antenna, in accordance with one or more exemplary embodiments.

FIG. 16 is a flowchart illustrating a method 1200 for modifying a distribution of a generated field with a parasitic antenna, in accordance with one or more exemplary embodiments. In block 1202, all parasitic antennas are opened, i.e., they have no current flowing in them.

In block 1204, it is determined whether there is a device located on the charging surface of a wireless power transmitter. The presence of a device on the charging surface of a wireless power transmitter can be determined by, for example, monitoring an impedance change at the transmitter, or by a communication from the receiver of a charging device over, for example, communication channel 119 (FIG. 2). If it is determined in block 1204 that there is no device located on the charging surface of a wireless charging transmitter, the process returns to block 1202. If it is determined in block 1204 that there is a device located on the charging surface of a wireless charging transmitter, the process proceeds to block 1206.

In block 1206, some or all of the parasitic antennas are momentarily and sequentially closed (e.g., be activated or enabled), and the location of a receiver on the charging surface is determined as described above in FIG. 14 or in FIG. 15.

In block 1208, parasitic antennas associated with locations on the charging surface having a device detected are placed in a resonant tuned state so that the magnetic field in the vicinity of a receiver is amplified.

Figure 17:
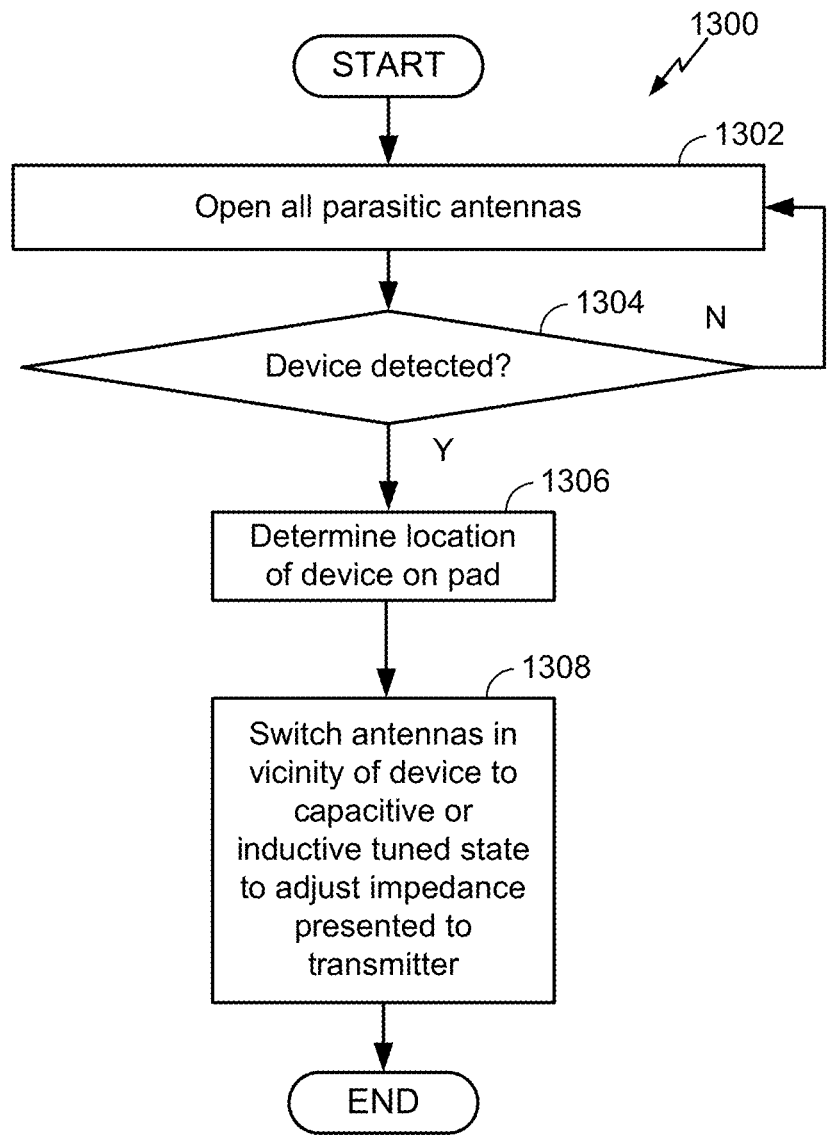
FIG. 17 is a flowchart illustrating another method for modifying a distribution of a generated field with a parasitic antenna, in accordance with one or more exemplary embodiments.

FIG. 17 is a flowchart illustrating another method 1300 for modifying a distribution of a generated field with a parasitic antenna, in accordance with one or more exemplary embodiments. In block 1302, all parasitic antennas are opened, i.e., they have no current flowing in them.

In block 1304, it is determined whether there is a device located on the charging surface of a wireless power transmitter. The presence of a device on the charging surface of a wireless power transmitter can be determined by, for example, monitoring an impedance change at the transmitter, or by a communication from the receiver of a charging device over, for example, communication channel 119 (FIG. 2). If it is determined in block 1304 that there is no device located on the charging surface of a wireless charging transmitter, the process returns to block 1302. If it is determined in block 1304 that there is a device located on the charging surface of a wireless charging transmitter, the process proceeds to block 1306.

In block 1306, some or all of the parasitic antennas are momentarily and sequentially closed (e.g., be activated or enabled), and the location of a receiver on the charging surface is determined as described above in FIG. 14 or in FIG. 15.

In block 1308, parasitic antennas associated with locations on the charging surface having a device detected are placed in a capacitive tuned state or in an inductive tuned state to compensate for capacitive load presented to a transmitter caused by open parasitic antennas. For example, the complex impedance of the transmit antenna 204 can be observed and adjusted to a desired impedance. In an exemplary embodiment, a complex power meter directly coupled to the output of the transmit antenna 204 may provide an indication of the complex impedance of the transmit antenna 204. In another exemplary embodiment, certain metrics of the power amplifier 210, such as, for example only, the zero crossing point (where voltage crosses zero inside the power amplifier 210) or peak voltage at the switching node of the power amplifier 210 may be used to determine the complex impedance of the transmit antenna 204. For example, for a class E amplifier, the switching node is the node at the drain of the FET (field effect transistor). In the case of a class D amplifier, the switching node is the node at the junction of the source and drain of the two FETs that form the class D amplifier. These are examples of indirect indications of the complex impedance at the transmit antenna 204.

Figure 18:
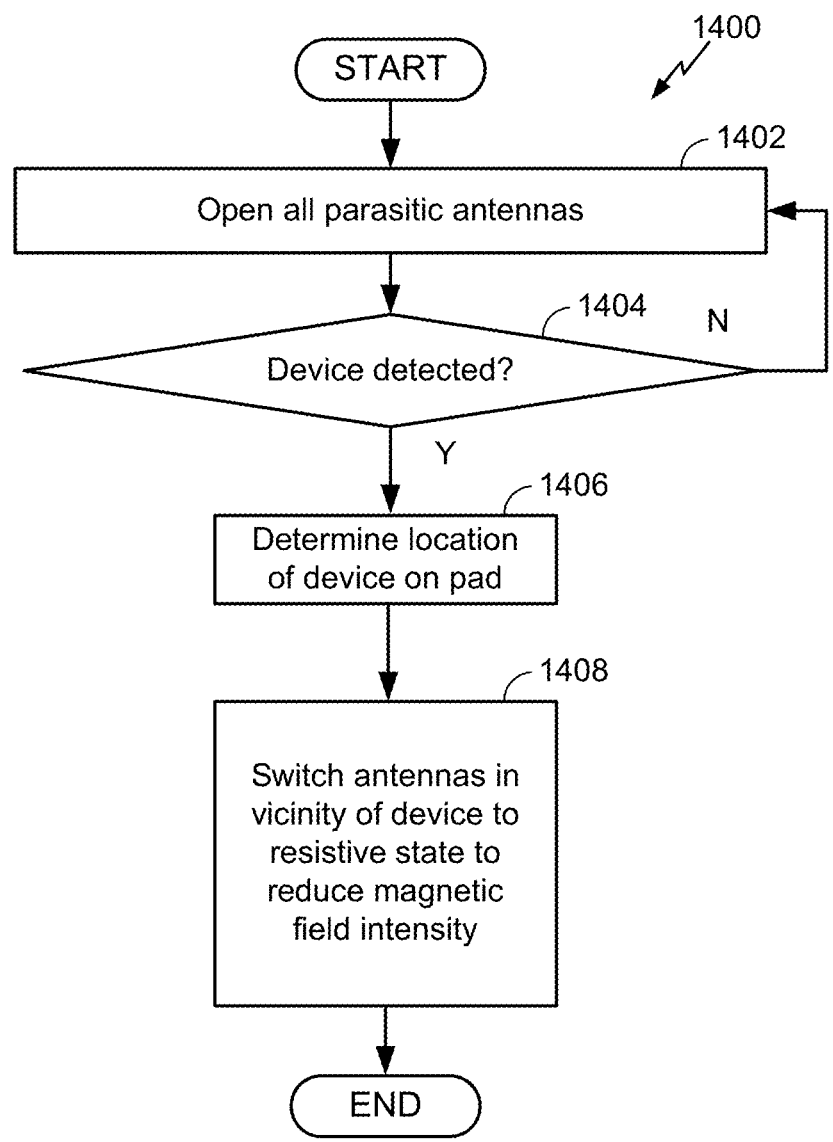
FIG. 18 is a flowchart illustrating another method for modifying a distribution of a generated field with a parasitic antenna, in accordance with one or more exemplary embodiments.

FIG. 18 is a flowchart illustrating another method 1400 for modifying a distribution of a generated field with a parasitic antenna, in accordance with one or more exemplary embodiments. In block 1402, all parasitic antennas are opened, i.e., they have no current flowing in them.

In block 1404, it is determined whether there is a device located on the charging surface of a wireless power transmitter. The presence of a device on the charging surface of a wireless power transmitter can be determined by, for example, monitoring an impedance change at the transmitter, or by a communication from the receiver of a charging device over, for example, communication channel 119 (FIG. 2). If it is determined in block 1404 that there is no device located on the charging surface of a wireless charging transmitter, the process returns to block 1402. If it is determined in block 1404 that there is a device located on the charging surface of a wireless charging transmitter, the process proceeds to block 1406.

In block 1406, some or all of the parasitic antennas are momentarily and sequentially closed (e.g., be activated), and the location of a receiver on the charging surface is determined as described above in FIG. 14 or in FIG. 15.

In block 1408, parasitic antennas associated with locations on the charging surface having a device detected are placed in a resistive state to attenuate or reduce the magnetic field generated by the transmit antenna. For example, when there is a receive device with a too-high receive voltage, the parasitic antenna between the transmit antenna 204 and the receive antenna 304 may be set to the resistive state to reduce voltage in the receive antenna 304.

Figure 19:
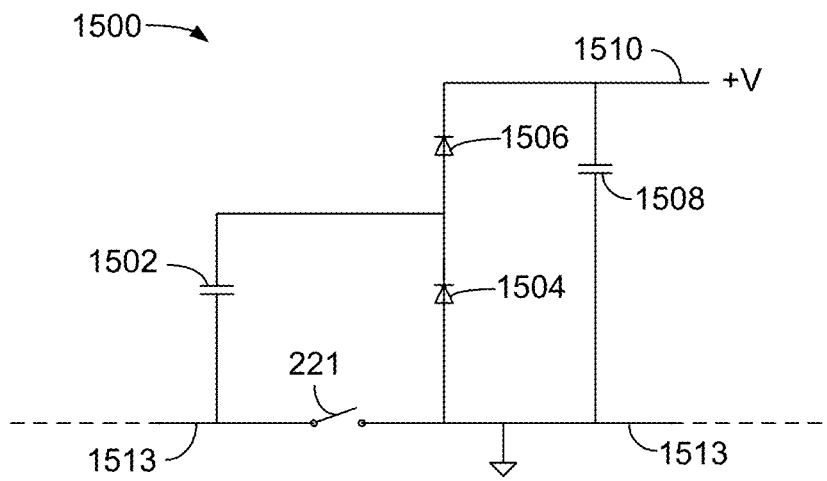
FIG. 19 is a schematic diagram showing an exemplary embodiment of a circuit that can be used to power a switch associated with a parasitic antenna.

FIG. 19 is a schematic diagram showing an exemplary embodiment of a circuit that can be used to power a switch associated with a parasitic antenna. Powering the switches that control the state of a parasitic antenna present a challenge due to the proximity of a parasitic antenna with respect to a transmit antenna. For example, a transmit antenna and a parasitic antenna may be located in a structure that forms the wireless charging surface on which a wireless power receiver may be placed, and may be separated from the transmit circuitry 202 (FIG. 4A) that provides power to the transmit antenna. Such difficulties make it desirable to have another way of powering the switches that control the parasitic antennas described herein. In an exemplary embodiment, the circuit 1500 may comprise a coupling circuit that comprises a switch 221, a capacitor 1502, a diode 1504, a diode 1506 and a capacitor 1508. The circuit 1500 may be part of a parasitic antenna 1513 where the capacitor 1502, the diode 1504, the diode 1506 and the capacitor 1508 are configured to develop a power signal that can power the circuitry that drives switch 221. The parasitic antenna 1513 can be an exemplary embodiment of any of the parasitic antennas described above.

The circuit 1500 illustrates an embodiment in which the capacitance across the switch 221 is used to power the switch 221. When the switch 221 is open, an AC voltage that can be similar to the AC voltage generated in a wireless power receive antenna (not shown) is induced in the parasitic antenna 1513 by the presence of the parasitic antenna 1513 in the magnetic field generated by the transmit antenna (not shown) is present across the switch 221. This AC voltage can be harvested with the capacitor 1502, rectified with the diodes 1504 and 1506 and used to generate a voltage that can be used to power the switch 221. In an exemplary embodiment, the value of the capacitor 1502 should be small relative to the value of any capacitance (not shown) used to tune the parasitic antenna 1513 or the transmit antenna (not shown). For example, if the transmit antenna is being tuned to resonance with a capacitor having a value of 820 pf, then the equivalent series capacitance of the capacitor 1502, the equivalent series capacitance made up by a combination of the capacitance of the diodes 1504 and 1506 and the capacitance of the capacitor 1508 should be significantly less than 820 pF, preferably on the order of 10% of the value. In the exemplary embodiment shown in FIG. 19, the capacitor 1502 is the most efficient location to have the relatively small capacitance value. In an exemplary embodiment, the value of the capacitor 1502 can be chosen to be less than 10% of the value of the resonant tuning capacitor (not shown).

The capacitor 1508 stores charge so the +V voltage provided on connection 1510 is DC rather than rectified AC. The +V output on connection 1510 can be provided as a power signal to a control circuit (such as the circuits shown in FIGS. 22 and 23) and can be used to power the devices that control the state of the switch 221.

Figure 20:
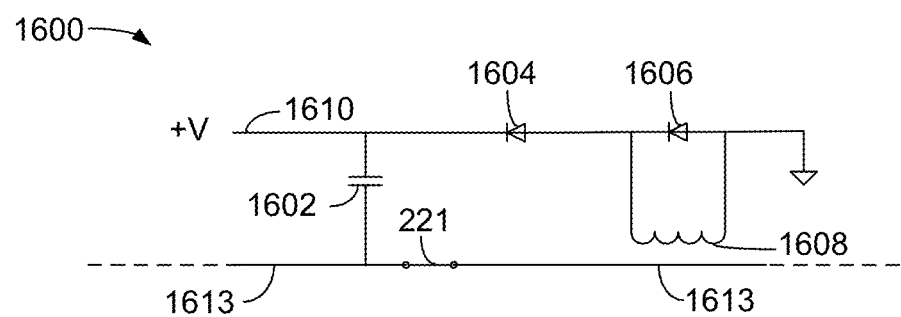
FIG. 20 is a schematic diagram showing an exemplary embodiment of a circuit that can be used to power a switch associated with a parasitic antenna.

FIG. 20 is a schematic diagram showing an exemplary embodiment of a circuit that can be used to power a switch associated with a parasitic antenna. In an exemplary embodiment, the circuit 1600 may comprise a coupling circuit that comprises a switch 221, a capacitor 1602, a diode 1604, a diode 1606 and a transformer 1608. The circuit 1600 may be part of a parasitic antenna 1613 where the capacitor 1602, the diode 1604, the diode 1606 and the transformer 1608 are configured to develop a power signal that can power the circuitry that drives the switch 221. The parasitic antenna 1613 can be an exemplary embodiment of any of the parasitic antennas described above.

The circuit 1600 illustrates an embodiment in which the mutual inductance between the parasitic antenna 1613 and the transformer coil 1608 is used to power the switch 221. When the switch 221 is closed, an AC current generated in the parasitic antenna 1613 in response to the magnetic field generated by a transmit antenna (not shown) is present through the parasitic antenna 1613. This current can be harvested with the transformer 1608. The transformer 1608 may comprise a few turns of wire around the parasitic antenna 1613. The inductance of the transformer 1608 may be small relative to the total inductance of the parasitic antenna 1613. The diodes 1604 and 1606 can be configured to rectify the voltage output of the transformer 1608 and generate a voltage that can be used to power the switch 221. The +V output on connection 1610 can be provided as a power signal to a control circuit (such as the circuits shown in FIGS. 22 and 23) and can be used to power the devices that control the state of the switch 221.

The determination of whether to use a capacitive circuit, such as the circuit 1500, or an inductive circuit, such as the circuit 1600 depends on use case. If the parasitic antennas are typically open, then a capacitive coupling is preferred. In a capacitive coupling implementation where the parasitic antennas are in a long term shorted state (also referred to as a blocking state, i.e., the parasitic antennas generate a field that opposes the wireless power transmit field to block the wireless power transmit field in region) the parasitic antenna should be opened periodically (perhaps for a very short time). If the parasitic antennas are typically closed, then inductive coupling is preferred. In an inductive coupling implementation where the parasitic antennas are in a long term open state, the parasitic antennas should be closed periodically (perhaps for a very short time). A combination of capacitive and inductive coupling may also be used. When a combination of capacitive and inductive coupling is used the rectifier diodes (1504, 1506 in FIG. 15; and 1604 and 1606 in FIG. 16) ensure that the power is logically ORed such that power is provided to the switch 221 in both open and closed states.

Figure 21:
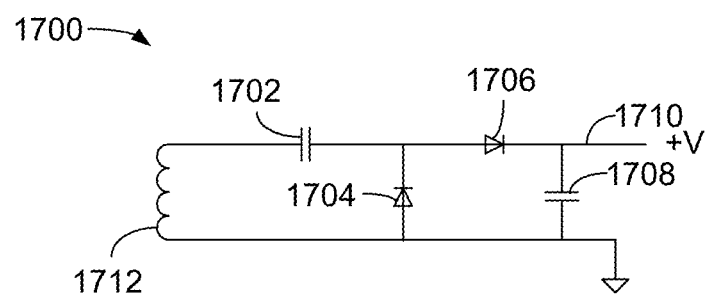
FIG. 21 is a schematic diagram showing an exemplary embodiment of a circuit that can be used to power a switch associated with a parasitic antenna.

FIG. 21 is a schematic diagram showing an exemplary embodiment of a circuit that can be used to power a switch (not shown) associated with a parasitic antenna. In an exemplary embodiment, the circuit 1700 may comprise a coupling circuit that comprises a coil 1712, a capacitor 1702, a diode 1704, a diode 1706 and a capacitor 1708. The circuit 1700 is separate from the parasitic antenna (not shown) that the circuit 1700 is powering and therefore, a switch 221 is not shown in FIG. 21. The coil 1712 is a separate coil that can be located in proximity to the parasitic antennas described herein.

The coil 1712 intercepts the magnetic field from the transmit antenna 204, rectifies the intercepted current, and provides the +V in the form of a DC voltage over connection 1710 to power a control circuit (such as the circuits shown in FIGS. 22 and 23) that can be used to power the devices that control the state of the switch 221 (not shown in FIG. 21). Since a very small amount of power is needed, the efficiency of the coil 1712 is not critical. However, since a moderate voltage is desired, typically the coil 1712 will contain many turns to achieve a desired minimum voltage in a small area.

It is desirable that the coil 1712 not disturb the power transfer field generated by the transmit antenna 204. Minimizing the size of the coil 1712, placing it near (or even over) the edge of the charge area, or orienting it away from the Z-axis (to accommodate the field near the edge) are all possible.

Figure 22:
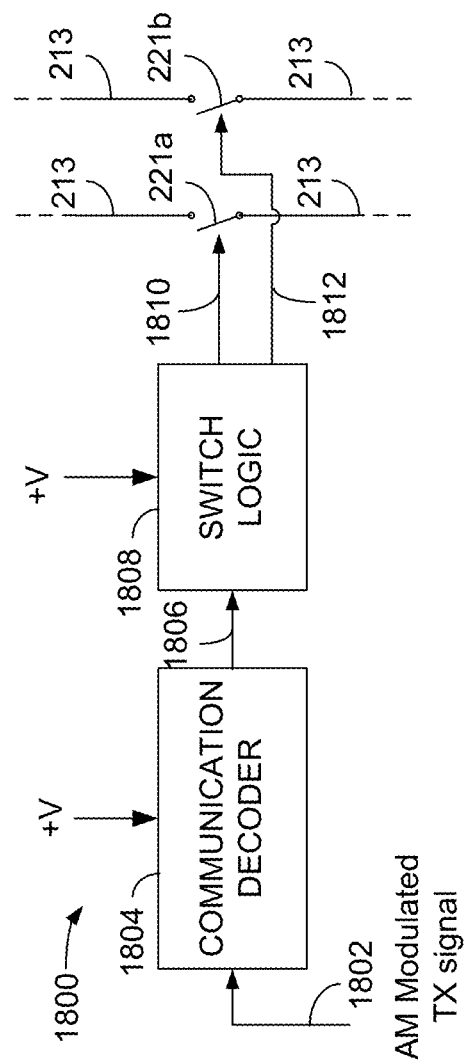
FIG. 22 is a block diagram showing an exemplary embodiment of a switch control circuit that can be used to control the switches associated with a parasitic antenna.

FIG. 22 is a block diagram showing an exemplary embodiment of a switch control circuit that can be used to control the switches associated with a parasitic antenna. In an exemplary embodiment, the circuit 1800 comprises a communication decoder 1804, switch logic 1808 and exemplary switches 221a and 221b. The communication decoder 1804 may comprise a communication decoder that may be configured to decode a variety of communication methodologies that may be provided by the transmit circuitry 202. In an exemplary embodiment, the communication decoder 1804 may be configured to decode in-band signaling or out-of-band signaling, and in an exemplary embodiment, may be powered by the circuitry described in any of FIGS. 19, 20 and 21.

In an exemplary embodiment, the communication decoder 1804 may be configured to decode an amplitude modulation methodology, such as, for example only, amplitude shift keying (ASK), or any other amplitude modulation methodology, which can be used to rapidly change (e.g., modulate) the strength of the field 106 that is used to provide charging energy. This change in rectified voltage can be decoded by the communication decoder 1804. In an exemplary embodiment, the communication decoder 1804 and the switch logic 1808 are configured to receive the +V output of the circuits 1500, 1600 or 1700 of FIGS. 19, 20 and 21, respectively. In an exemplary embodiment, an AM modulation can be imposed on the transmit signal and can be present on the +V signal provided by the circuits 1500, 1600, or 1700 of FIGS. 19, 20 and 21, respectively, and provided to the communication decoder 1804 and the switch logic 1808 on the +V signal. In an exemplary embodiment, although the modulated AM signal may be provided to the communication decoder 1804 and the switch logic 1808 on the +V signal, an AM modulated TX signal is also shown as being provided over connection 1802 to the communication decoder 1804 to illustrate an alternative embodiment where the AM modulated TX signal may be provided on a signal other that the +V signal, such as, from a voltage peak detector (not shown).

In an exemplary embodiment, the AM modulated transmit signal can be provided by the transmitter 200. In an exemplary embodiment, the controller 214 in the transmitter 200 modulates the field 106 that provides the energy transfer. In an exemplary embodiment where the wireless power transfer occurs at an exemplary frequency of 6.78 MHz, an amplitude modulation methodology such as ASK can be used to modulate the amplitude of the field 106 at a relatively low rate of approximately +/−15 KHz. The communication decoder 1804 interprets the change in the rectified voltage caused by the AM signal and provides a control signal over connection 1806 to the switch logic 1808. In an exemplary embodiment, the control signal on connection 1806 may be an asynchronous serial signal (like a signal corresponding to the RS-232 communication standard), may be a DC-balanced signal, such as one generated by Manchester coding, where two transitions would encode a 1 (and close that switch) and one transition would encode a 0 (and open that switch), or another control signal.

In an exemplary embodiment, the modulation method may be chosen to be DC-balanced, such as for example only Manchester encoding, so that the average strength of the field 106 is not affected. The modulation method should also be sufficiently fast so that the change in field 106 is not detected by a receiver in the charge area. This effectively means that it may be preferable for the RC (resistive-capacitive) time constant of the parasitic loop switch circuitry to be shorter than the RC time constant of the receiver.

The switch logic 1808 receives the control signal on connection 1806 and develops a control signal that can be used to control the switches 221a and 221b. In an exemplary embodiment, the switch logic may take the decoded serial signal from the communication decoder 1804 and break it down to signals configured to drive the individual switches 221a, 221b, etc. While two switches 221a and 221b are shown as an example in FIG. 22, more or fewer switches 221 may be implemented, depending on the configuration of the parasitic antenna 213. The control signal from the switch logic 1808 is provided to control the operation of the switches 221a and 221b over respective connections 1810 and 1812. In an exemplary embodiment, the control signals on connections 1810 and 1812 are responsive to the power signal provided by any of the circuits 1500, 1600 and 1700 described herein and a modulation signal developed by the transmitter. While the parasitic antenna 213 is illustrated in FIG. 22 for example only, any of the parasitic antennas described herein may be implemented. For example when the transmit circuitry 202 detects the location of a wireless power receiver, the transmit circuitry 202 communicates to each parasitic control circuit of FIGS. 19, 20 and 21, as described herein, whether or how to control a switch 221 and then the circuit 1800 may use the information to control the switch 221.

Figure 23:
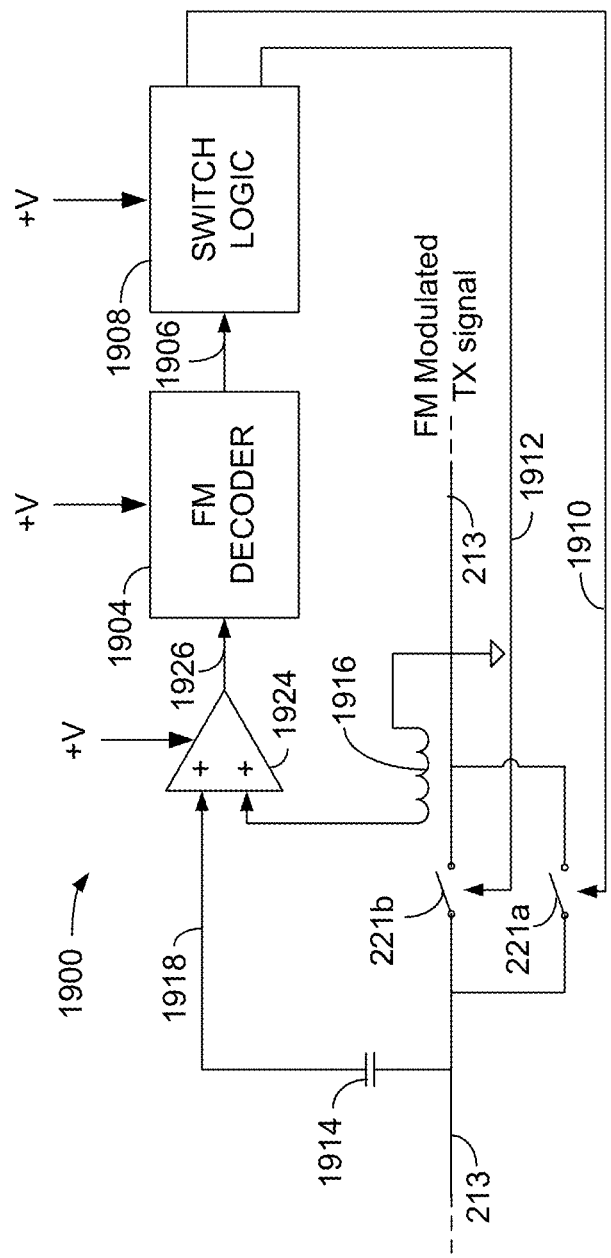
FIG. 23 is a block diagram showing an exemplary embodiment of a switch control circuit that can be used to control the switches associated with a parasitic antenna.

FIG. 23 is a block diagram showing an exemplary embodiment of a switch control circuit that can be used to control the switches associated with a parasitic antenna. In an exemplary embodiment, the circuit 1900 comprises a communication decoder embodied as a frequency-modulation (FM) decoder 1904, switch logic 1908, an operational amplifier (OPAMP) 1924, an inductive coupler 1916 a capacitive coupler 1914 and exemplary switches 221a and 221b.

In an exemplary embodiment, a frequency modulation methodology, such as, for example only, frequency shift keying (FSK), or any other frequency modulation methodology, is used to vary the frequency of the field 106 that is used to provide charging energy. This change in the field frequency can be detected by the circuit of FIG. 23 and will result in a change in the detected frequency. This change in frequency can be decoded by the FM decoder 1904. In an exemplary embodiment, the OPAMP 1924, the FM decoder 1904 and the switch logic 1908 are configured to receive the +V output of the circuits 1500, 1600 or 1700 of FIGS. 19, 20 and 21, respectively, to power the FM decoder 1904 and the switch logic 1908, but, in an exemplary embodiment, the change in the field frequency is detected by the inductive coupler 1916 and the capacitive coupler 1914.

In an exemplary embodiment, the FM modulated transmit signal can be provided by the transmitter 200. In an exemplary embodiment, the controller 214 in the transmitter 200 modulates the frequency of the oscillator 212 (FIG. 4A) that provides the driving frequency. In an exemplary embodiment where the wireless power transfer occurs at an exemplary frequency of 6.78 MHz, a frequency modulation methodology such as FSK can be used to modulate the frequency of the field 106 at a relatively low rate of approximately +/−1 KHz. The current portion of the frequency modulation that is present on the parasitic antenna 213 is provided by the inductive coupler 1916 to one input of the OPAMP 1924. The voltage portion of the frequency modulation that is present on the parasitic antenna 213 is provided by the capacitive coupler 1914 to the other input of the OPAMP 1924 over connection 1918. The OPAMP 1924 amplifies the signal from the inductive coupler 1916 and the capacitive coupler 1914 and provides an amplified output over connection 1926 to the FM decoder 1904. Either the current portion of the frequency modulation or the voltage portion of the frequency modulation may be absent based on the state of the switches 221a and 221b. For example, there is no voltage when a parasitic antenna is shorted. The voltage and current are summed by the OPAMP 1924 so there is always a signal available on connection 1926 to drive the FM decoder 1904.

The FM decoder 1904 interprets the change in the frequency caused by the modulated FM signal and provides a control signal over connection 1906 to the switch logic 1908. In an exemplary embodiment, the control signal on connection 1906 may be similar to the control signal on connection 1806 (FIG. 22).

In an exemplary embodiment, the modulation method is chosen to be DC-balanced such as for example only Manchester encoding, so that the average frequency of the field 106 is not affected.

The switch logic 1908 receives the control signal on connection 1906 and develops a control signal that can be used to control the switches 221a and 221b. In an exemplary embodiment, the switch logic 1908 may take the decoded serial signal from the FM decoder 1904 and generate signals configured to drive the individual switches 221a, 221b, etc. While two switches 221a and 221b are shown as an example in FIG. 23, more or fewer switches 221 may be implemented.

The control signal from the switch logic 1908 is provided to control the operation of the switches 221a and 221b over respective connections 1910 and 1912. While the parasitic antenna 213 is illustrated in FIG. 23 for example only, any of the parasitic antennas described herein may be implemented.

Figure 24:
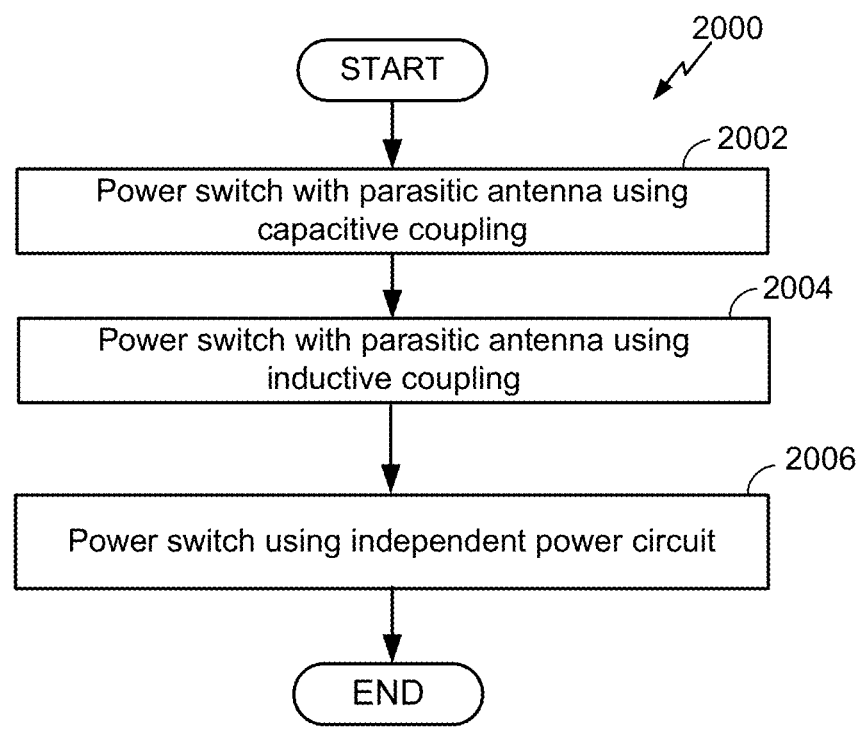
FIG. 24 is a flowchart illustrating an exemplary embodiment of a method for controlling the switching of a parasitic antenna.

FIG. 24 is a flowchart illustrating an exemplary embodiment of a method 2000 for controlling the switching of a parasitic antenna. The blocks in the method 2000 can be performed in or out of the order shown.

In block 2002, the switch 221 is powered by the parasitic antenna using a capacitive coupling.

In block 2004, the switch 221 is powered by the parasitic antenna using an inductive coupling.

In block 2006, the switch 221 is powered by an independent power receiver.

Figure 25:
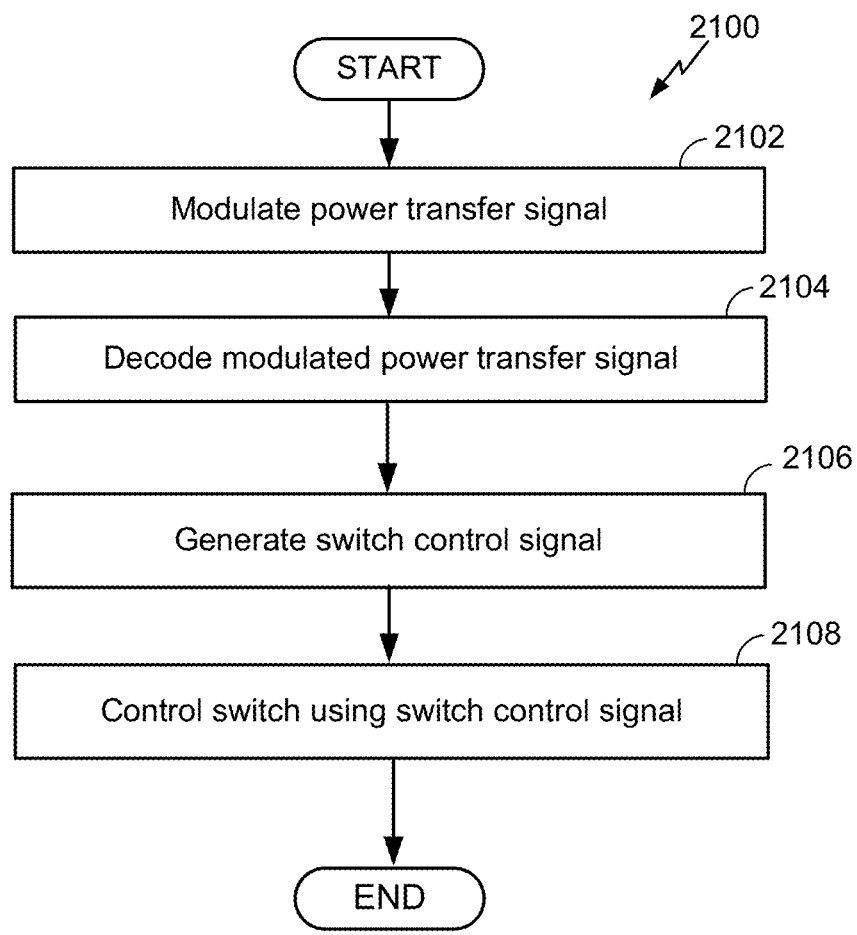
FIG. 25 is a flowchart illustrating an exemplary embodiment of a method for controlling the switching of a parasitic antenna.

FIG. 25 is a flowchart illustrating an exemplary embodiment of a method 2100 for controlling the switching of a parasitic antenna. The blocks in the method 2100 can be performed in or out of the order shown.

In block 2102, the power transfer signal is modulated. In an exemplary embodiment, the power transfer signal may be modulated with an AM signal or an FM signal. In an exemplary embodiment, the power transfer signal can be modulated by rapidly changing (e.g., modulating) the field 106 that is used to provide charging energy. The change in the field may be a change in the strength of the field or a change in the frequency of the field. The change in the field may be detected by the circuits of FIGS. 19, 20 and 21 and will result in a change in the rectified voltage or a change in the detected frequency.

In block 2104, the modulated power transfer signal is decoded. For example, the change in rectified voltage in block 2102 can be decoded by the AM decoder 1804 or the change in the frequency in block 2102 may be decoded by the FM decoder 1904.

In block 2106, the decoded power transfer signal is used to generate a switch control signal. For example, the switch logic 1808 or the switch logic 1908 will receive a serial data signal from the decoder, and use that serial data signal to determine which switch to close. A simple method would be to receive an octet (8 bits) of serial data, and drive up to eight switches open or closed depending on whether the corresponding bit in the stream was a 1 or a 0.

In block 2108, the switch control signal is used to control the switch or switches that control the parasitic antenna or antennas.

In an exemplary embodiment, any of the exemplary embodiments of a wireless power transmitter described herein may be associated with or form a part of a wireless charging surface, table, mat, pad, or other charging surface that may be configured to charge one or more wireless power receivers. In an exemplary embodiment, any of the exemplary embodiments of a wireless power transmitter described herein may comprise a plurality of parasitic antennas having the powering circuitry described in FIGS. 19, 20 and 20, and the control circuitry described in FIGS. 22 and 23 that can be powered by the magnetic field generated by the transmit circuitry. The control circuitry may receive the control information using in-band signaling or out-of-band signaling, to control the switches for the parasitic antennas to modify the field distribution of the magnetic field for wirelessly transferring power. In such an exemplary embodiment, a single wireless transmit antenna may generate a wireless charging field that can power and control more than one parasitic antenna.

In accordance with the embodiments described above, in various aspects of certain embodiments, the parasitic coils may be configured as controlled "repeater" coils that are configured to extend the range of a charging field generated by a driven transmit antenna. For example, in accordance with an aspect of an embodiment, a transmit antenna configured to be driven by a driver circuit powered by a power supply to generate a magnetic field (e.g., driven transmit antenna) may be positioned under a desk or other surface for charging. A set of "repeater" antennas (e.g., various configurations of the parasitic antennas described above) may be positioned on the top (or opposite surface) of the desk or other surface for charging. The magnetic field generated by the transmit antenna at the surface of the desk may be reduced given the barrier of the desk or other surface, but a field could locally be increased in focused regions at the surface of the repeater antenna when the repeater antenna is tuned to resonance. Other positioning of "repeater" antennas in relation to the driven transmit antenna are also contemplated.

In accordance with an aspect of this embodiment, to manage the field, the repeater antenna includes circuitry configured to tune the repeater antenna to resonance when a charge-receiving device is present and de-tune the repeater antenna when no charge-receiving device is present or no power is requested, or the charge-receiving device is not in the area covered by the repeater. The configurations and circuitry described above may be used for the repeater antennas for the tuning. Furthermore, in accordance with another aspect, the repeater antenna is configured to operate without being locally connected to a power source to perform the tuning operations. Therefore, in accordance with this aspect, the repeater is configured to harvest some of the power generated from the magnetic field generated by the transmit antenna in order to power any circuitry required to tune/control the state of the repeater antenna. These repeater antennas may therefore include any of the circuitry or perform operations as described with reference to FIGS. 19-25 to harvest energy, receive communications for controlling the state of the repeater antennas, and control the state of repeater antennas (e.g., tuned to resonance or tuned away from resonance).

As such, a repeater in accordance with one aspect of embodiments may include a resonant circuit including a coil or a repeater antenna that is configured to generate a magnetic field in response to being in the presence of a magnetic field generated by a transmit antenna. The repeater includes tuning circuitry configured to adjust the resonant frequency or resonance point of the resonant circuit and particularly for tuning the resonant circuit to be resonant at the frequency of the magnetic field generated by the transmit antenna or to be tuned away from resonance relative to the frequency of the magnetic field generated by the transmit antenna (or otherwise de-activing the repeater form generating any significant field). Examples of tuning circuitry have been described above. Furthermore, the repeater includes an energy harvesting circuit configured to harvest energy for powering the tuning circuit. Certain examples of harvesting circuitry are described above, for example, with reference to FIGS. 19-21. The repeater may further include a control circuit configured to be powered using the harvested energy and configured to apply one or more control signals to the tuning circuit. Furthermore, the control circuit may be configured to determine when to apply the control signals to tune the resonator based on one or more detected conditions (e.g., using sensors or other detection circuitry as described above configured to detect the presence of a charge-receiving device that may be further powered by the harvested energy) or based on communications received (e.g., the control circuit may include a communication circuit as described above with reference to FIGS. 22-25).

In accordance with certain embodiments, the control circuit may be configured to act as follows. For example, the control circuit may be configured to cause the repeater antenna to generate a beacon (e.g., an intermittent lower power pulse). This may be accomplished by periodically briefly tuning the resonant circuit of the repeater to resonance if the transmit antenna is generating a magnetic field or tuning the resonant circuit and letting a beacon generated by the transmit antenna be re-generated by the repeater antenna in a tuned state. In response to the presence of a charge receiving device in the field generated by the repeater antenna, the control circuit may be configured to detect the presence based on changes in absorbed current/power during the beacon. If the presence of the charge-receiving device is detected, the control circuit tunes the tunable repeater to resonance to allow further power transfer to the charge-receiving device via at least in part the field generated by the repeater antenna. The control circuit may be further configured to terminate the power transfer (e.g., de-tune) after a period of time when no power transfer is detected. In this case the repeater antenna in an aspect may act independently to tune the repeater to and away from resonance based on detected presence.

In aspects of other embodiments, the control circuit may include communication circuitry as described above configured to wirelessly communicate with a controller of the transmitter including the transmit antenna. If the control circuit of the repeater detects the potential presence of a charge-receiving device or other measurements indicative of a change in power absorbed, the control circuit of the repeater may communicate this information wirelessly to the controller of the transmitter including the transmit antenna. The controller of the transmitter may determine whether a valid (e.g., compliant) device is present and communicate to the control circuit of the repeater to enable power transfer, tune the resonant circuit of the repeater to resonance, etc. Note that the communication circuitry may include any of the communication circuitry described above including an out-of-band communication link such as Bluetooth low energy (as one non-limiting example). Furthermore, based on communications or other detection, the transmitter controller may communicate to the repeater when to terminate power transfer (e.g., de-tune).

In accordance with aspects of various embodiments, the repeater antenna may be positioned at some angle relative to the driven transmit antenna (e.g., geometric planes defined by the antennas are not parallel). This 'out-of-plane' repeater may be used to "steer" a field generated by the transmitter antenna at different angles. For example, a repeater antenna (e.g., or coil) at 45 degrees to the plane of the transmit antenna can be used to steer a significant component of the field generated by the transmit antenna to a receiver that is 90 degrees out of plane with the powered transmit antenna. In accordance with an aspect of an embodiment, a series of repeater antennas that are out of plane with the transmit antenna may be spaced around a periphery of a charge area that could provide power to a receiver in any given orientation.

Figure 26:
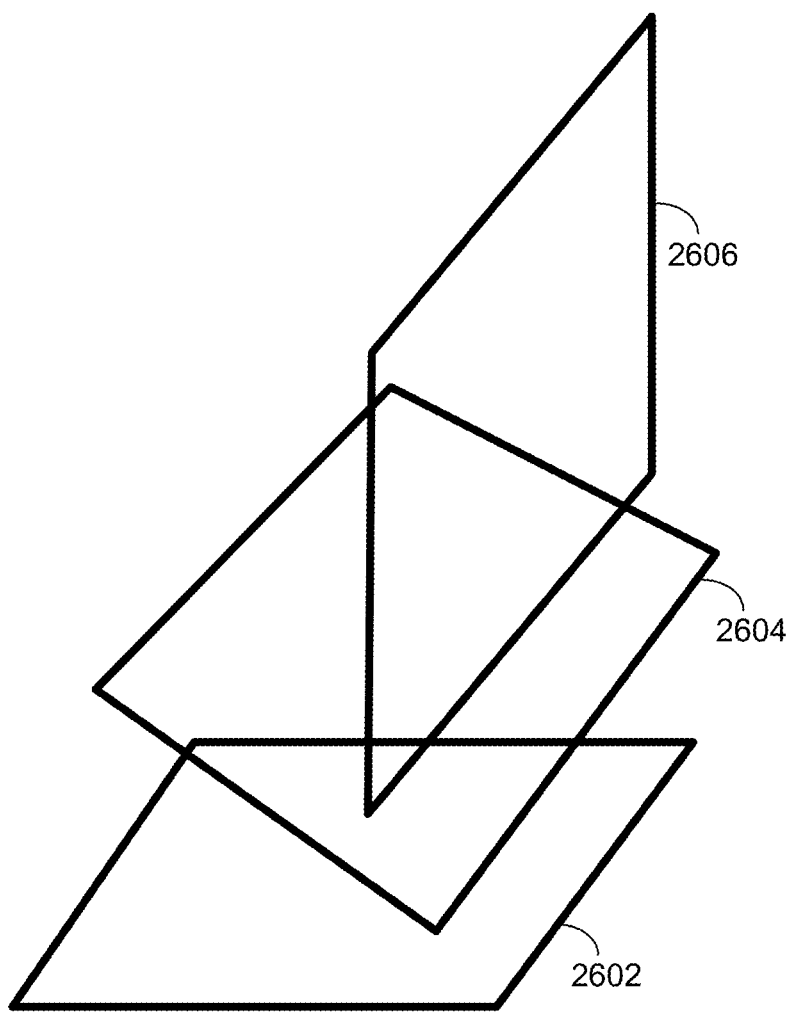
FIG. 26 shows a configuration of a transmit antenna, a repeater antenna, and a receiver antenna.

FIG. 26 shows a configuration of a transmit antenna 2602, a repeater antenna 2604, and a receiver antenna 2606. As shown, the repeater antenna 2604 is located at an angle relative to the plane of the transmit antenna 2602 (e.g., out-of-plane). The receiver antenna 2606 that may be positioned in a charge-receiving device may be configured to couple power via a magnetic field re-generated from the repeater antenna 2604 when the transmit antenna 2602 generates a field.

Figure 27:
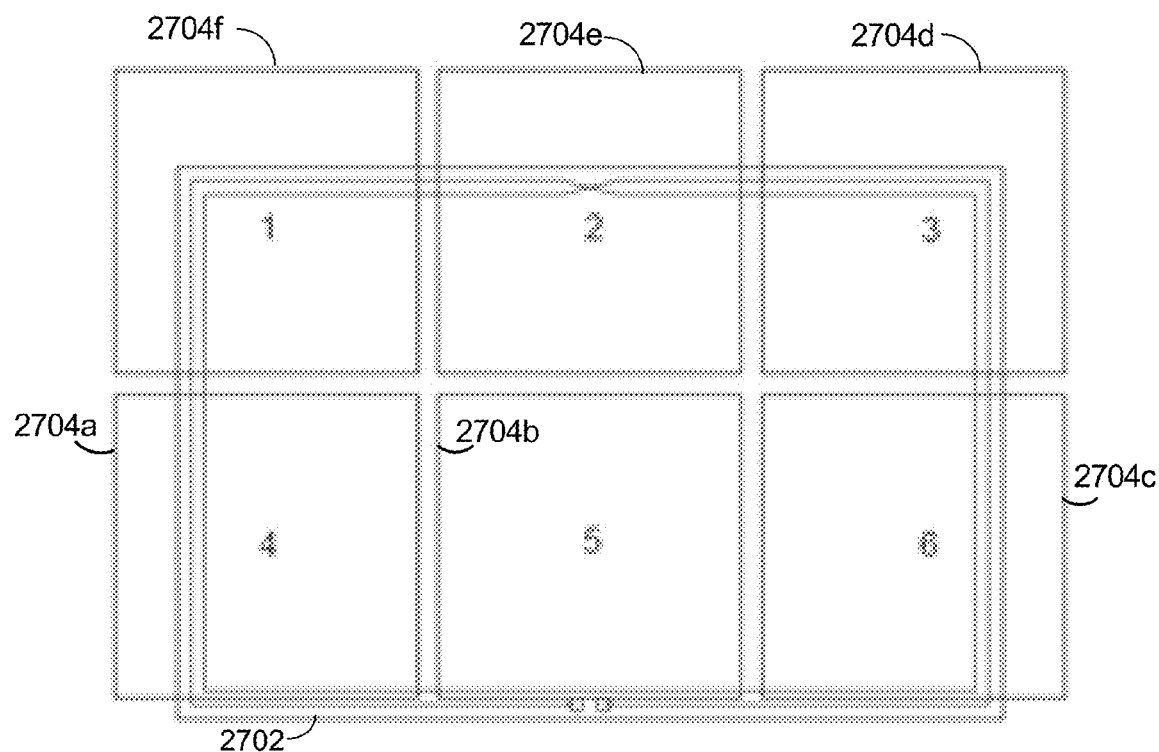
FIG. 27 shows a configuration of a smaller transmit antenna with a larger array of repeater antennas.

As a further example, in accordance with another embodiment a set of repeater antennas may be provided to power a larger area with a smaller transmit antenna. For example, in accordance with an aspect of an embodiment, a large array of repeaters can be used to focus power from a smaller transmit antennas. FIG. 27 shows a configuration of a smaller transmit antenna 2702 with a larger array of repeater antennas 2704*a*-2704*f*. As shown, the total size of the array of repeater antennas 2704*a*-2704*f* is larger than the area of the transmit antenna 2702 and several of the repeater antennas 2704*a*-7204*f* extend beyond the perimeters of the transmit antenna 2702. Repeater antenna 2704*a* may be tuned and used to 'focus' power from the driven transmit antenna 2702 to a charge-receiving device within the boundaries of the repeater antenna 2704*a*.

It should be appreciated that as described above, the repeaters may be autonomous and may be configured to be individually tuned when a charge-receiving device is detected within the boundaries of the repeater or repeaters. Additionally, a repeater may only be tuned when a charge-receiving device is placed outside the boundaries of the primary transmit antenna, but within the boundaries of the repeaters. The detection may be based on any or a combination of receiving a communication from nearby, sensing a reactance shift—change in voltage/phase induced in untuned coil), detecting a change in a capacitive sensor, detecting a presence pulse from a receiver, and the like. The repeater may share information with the primary transmit loop to determine whether the device is outside the area covered by the primary transmit loop but within the area covered by the repeaters.

Furthermore distance may be increased between the driven transmit antennas and the repeaters. This distance may provide magnetic field isolation or could be used for a desired aesthetic result (e.g., charger under desk, repeater in a stand).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. An apparatus for controlling magnetic field distribution, comprising:
    a wireless transmit antenna configured to generate a magnetic field for wirelessly transferring power to a charge-receiving device with the wireless transmit antenna; and
    a plurality of parasitic antennas, each of the plurality of parasitic antennas configured to momentarily and sequentially be activated by a respective switch to determine a location of the charge-receiving device on a charging surface,
    wherein at least one selected parasitic antenna of the plurality of parasitic antennas is configured to be enabled to modify the magnetic field in response to an antenna parameter that indicates the presence of the charge-receiving device relative to the at least one selected parasitic antenna in a location on the charging surface having no charge-receiving device.

2. The apparatus of claim 1, wherein the antenna parameter comprises at least one of a voltage parameter at the wireless transmit antenna, a voltage parameter at a wireless receive antenna at a receiver, a reactance parameter at the wireless transmit antenna, and a reactance parameter at the wireless receive antenna at the receiver.

3. The apparatus of claim 1, wherein at least one of the plurality of parasitic antennas is configured to amplify the magnetic field in response to the antenna parameter.

4. The apparatus of claim 1, wherein at least one of the plurality of parasitic antennas is configured to operate in a resonant tuned state in response to the antenna parameter.

5. The apparatus of claim 1, wherein at least one of the plurality of parasitic antennas is configured to operate in a resistive state in response to the antenna parameter.

6. The apparatus of claim 1, wherein at least one of the plurality of parasitic antennas is configured to change an impedance of the wireless transmit antenna in response to the antenna parameter.

7. The apparatus of claim 1, wherein at least one of the plurality of parasitic antennas is configured to operate in at least one of a capacitive tuned state or an inductive tune state in response to the antenna parameter.

8. The apparatus of claim 1, further comprising a housing defining a charging surface for placement of a plurality of charge-receiving devices including the charge-receiving device, the housing configured to house the wireless transmit antenna and the plurality of parasitic antennas.

9. The apparatus of claim 1, further comprising:
    a first circuit wirelessly coupled to the magnetic field, the first circuit configured to generate a power signal in response to power coupled via the magnetic field, the power signal configured to power a second circuit that controls the switch.

10. The apparatus of claim 9, wherein the second circuit is electrically coupled to the first circuit, the second circuit configured to generate a control signal to control a state of the switch, the control signal responsive to the power signal and a modulation signal developed by the wireless transmit antenna.

11. A method for controlling magnetic field distribution, comprising:
    generating a magnetic field for wirelessly transferring power to a charge-receiving device using a wireless transmit antenna;
    momentarily and sequentially activating each of a plurality of parasitic antennas in a set of parasitic antennas;
    determining a location of the charge-receiving device on a charging surface; and
    enabling selected parasitic antennas of the plurality of parasitic antennas to modify the magnetic field in locations on the charging surface having no charge-receiving device.

12. The method of claim 11, further comprising activating selected parasitic antennas of the plurality of parasitic antennas responsive to any of a voltage parameter and a reactance parameter at the wireless transmit antenna.

13. The method of claim 11, further comprising amplifying the magnetic field in response to an antenna parameter that indicates the presence of the charge-receiving device relative to at least one selected parasitic antenna of the plurality of parasitic antennas.

14. The method of claim 11, further comprising operating at least one of the plurality of parasitic antennas in a resonant tuned state in response to an antenna parameter that indicates the presence of the charge-receiving device relative to at least one selected parasitic antenna of the plurality of parasitic antennas.

15. The method of claim 11, further comprising changing an impedance of the wireless transmit antenna in response to an antenna parameter that indicates the presence of the charge-receiving device relative to at least one selected parasitic antenna of the plurality of parasitic antennas.

16. The method of claim 15, further comprising operating at least one of the plurality of parasitic antennas in any of a capacitive tuned state and an inductive tuned state in response to the antenna parameter.

17. The method of claim 11, further comprising operating at least one of the plurality of parasitic antennas in a resistive state in response to an antenna parameter that indicates the presence of the charge-receiving device relative to at least one selected parasitic antenna of the plurality of parasitic antennas.

18. The method of claim 11, further comprising generating a power signal in response to the magnetic field, the power signal configured to power a switch that momentarily and sequentially activates each of the plurality of parasitic antennas.

19. The method of claim 18, further comprising generating a control signal to control a state of the switch, the control signal responsive to the power signal and a modulation signal developed by the wireless transmit antenna.

20. The method of claim 11, wherein determining a location of the charge-receiving device further comprises detecting a voltage change at the wireless transmit antenna.

21. The method of claim 11, wherein determining a location of the charge-receiving device further comprises detecting a reactance change at the wireless transmit antenna.

22. A device for controlling magnetic field distribution, comprising:
- means for generating a first magnetic field for wirelessly transferring power to a charge-receiving device;
- means for generating a second magnetic field that alters the first magnetic field;
- means for momentarily and sequentially activating each of a plurality of parasitic antennas in a set of parasitic antennas;
- means for determining a location of the charge-receiving device on a charging surface; and
- means for enabling selected parasitic antennas of the plurality of parasitic antennas to modify the magnetic field in locations on the charging surface having no charge-receiving device.

\* \* \* \* \*